(12) United States Patent
Sato

(10) Patent No.: US 8,483,176 B2
(45) Date of Patent: Jul. 9, 2013

(54) PACKET COMMUNICATION METHOD, PACKET COMMUNICATION SYSTEM, WIRELESS TERMINAL, AND PACKET COMMUNICATION DEVICE

(75) Inventor: Izuru Sato, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1034 days.

(21) Appl. No.: 12/255,692

(22) Filed: Oct. 22, 2008

(65) Prior Publication Data

US 2009/0109924 A1    Apr. 30, 2009

(30) Foreign Application Priority Data

Oct. 26, 2007    (JP) .................. 2007-279116

(51) Int. Cl.
*H04W 4/00*    (2009.01)
(52) U.S. Cl.
USPC .......................... 370/331; 455/436
(58) Field of Classification Search
USPC .............. 370/310–350; 455/422.1–460
See application file for complete search history.

(56) References Cited

U.S. PATENT DOCUMENTS

| 2003/0227871 | A1 | 12/2003 | Hsu et al. | |
|---|---|---|---|---|
| 2004/0042507 | A1 | 3/2004 | Pelletier et al. | |
| 2004/0148427 | A1* | 7/2004 | Nakhjiri et al. | 709/237 |
| 2005/0265284 | A1* | 12/2005 | Hsu et al. | 370/331 |

FOREIGN PATENT DOCUMENTS

| EP | 1 798 929 | 6/2007 |
|---|---|---|
| JP | 2005-529554 | 9/2005 |
| JP | 2008522482 | 6/2008 |
| WO | 2006080758 | 8/2006 |

OTHER PUBLICATIONS

ETSI TR 125 912 V7.2.0 (Jun. 2007) Technical Report; Universal Mobile Telecommunications System (UMTS); Feasibility study for evolved Universal Terrestrial Radio Access (UTRA) and Universal Terrestrial Radio Access Network(UTRAN) (3GPP TR 25.912 version 7.2.0 Release 7); XP014039724; ETSI, Sophia Antipolis Cedex, France; Dated Jun. 2007.
Extended European Search Report and Annex to the European Search Report including the European Search Opinion on European Patent Application No. EP08167330.3-2413; Dated Mar. 12, 2009.
3GPP TS 23.401 V1.2.1 GPRS enhancements for E-Utran access (Release 8) Sep. 2007.
3GPP TS 36.300 V8.2.0 Evolved Universal Terrestrial Radio Access (E-UTRA) and Evolved Universal Terrestrial Radio Access Network (E-UTRAN); Overall description Stage 2 (Release 8) Sep. 2007.

* cited by examiner

*Primary Examiner* — Hassan Kizou
*Assistant Examiner* — Ashil Farahmand
(74) *Attorney, Agent, or Firm* — Myers Wolin, LLC

(57) ABSTRACT

A packet communication system having a wireless terminal, a plurality of wireless access networks, and a packet communication device connected to the respective wireless access networks, that includes a unit controlling handover processing for handover of the wireless terminal to a different wireless access network. Also included is a unit checking whether a handover destination wireless access network supports a header compression or decompression method used in a first packet communication performed through a handover source wireless access network, at a time of the handover. Also included is a unit controlling an execution point for processing corresponding to the header compression or decompression method to be specified at the packet communication device for a second packet communication performed through the handover destination wireless access network, when the above network does not support the method.

4 Claims, 22 Drawing Sheets

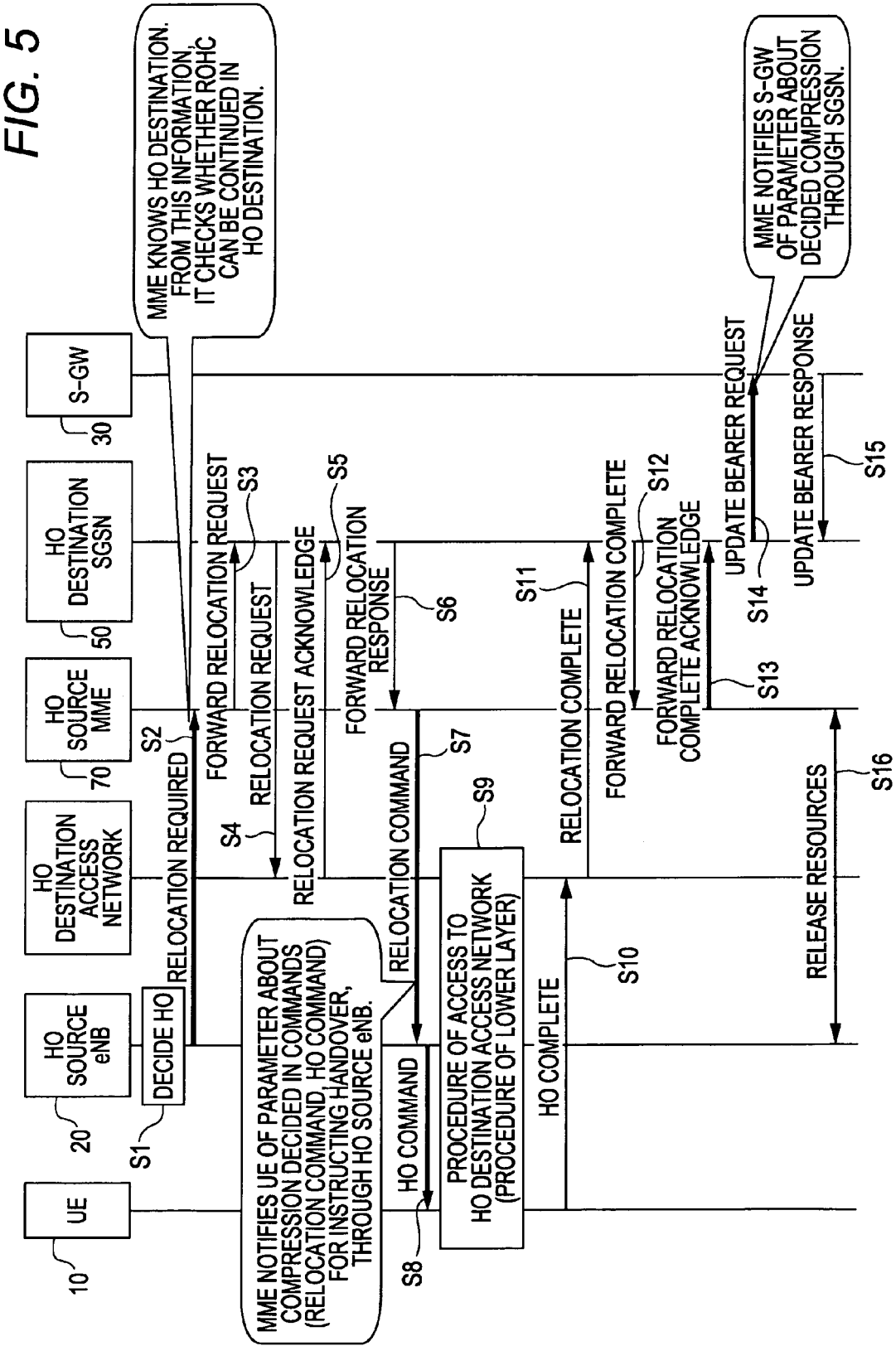

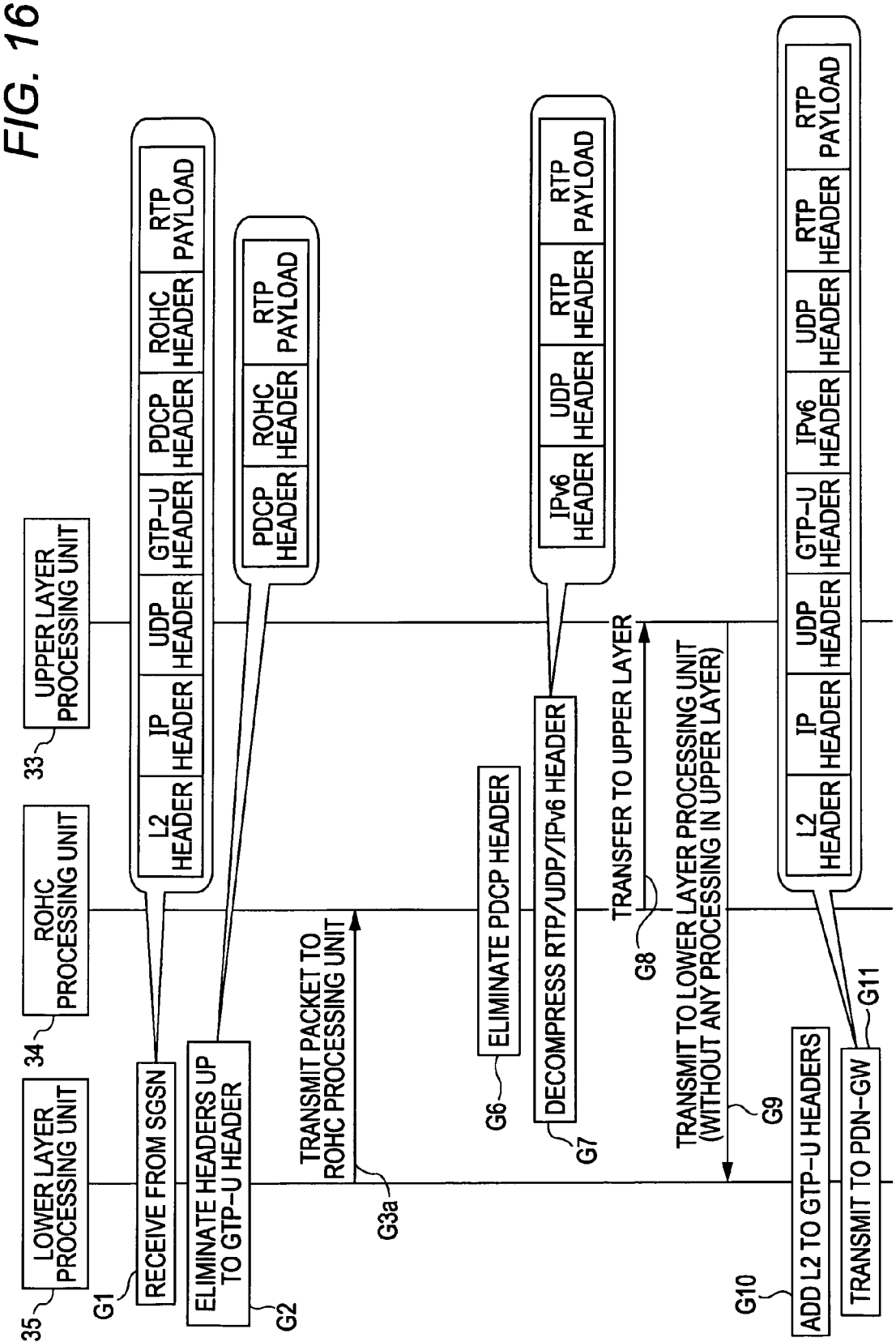

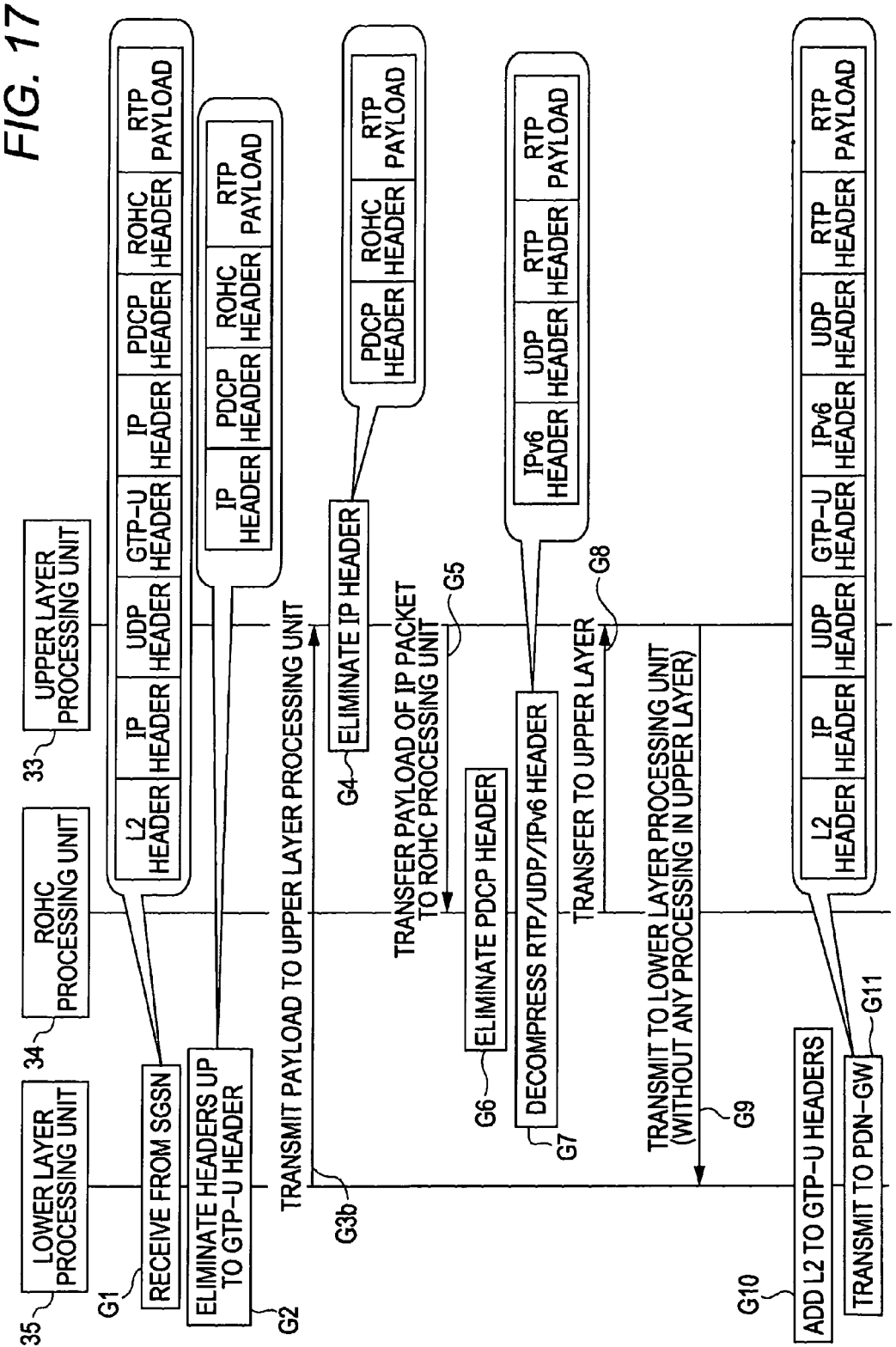

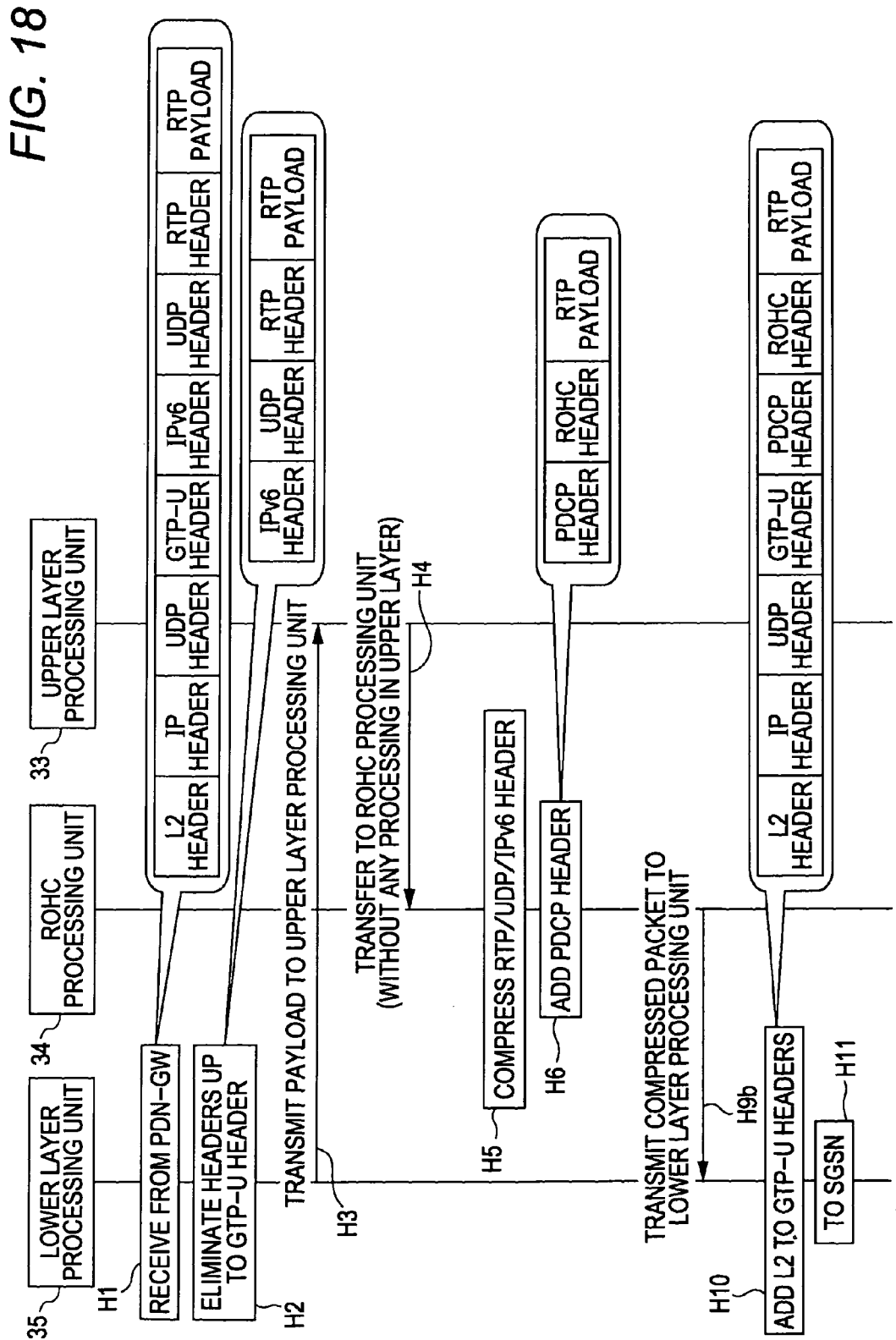

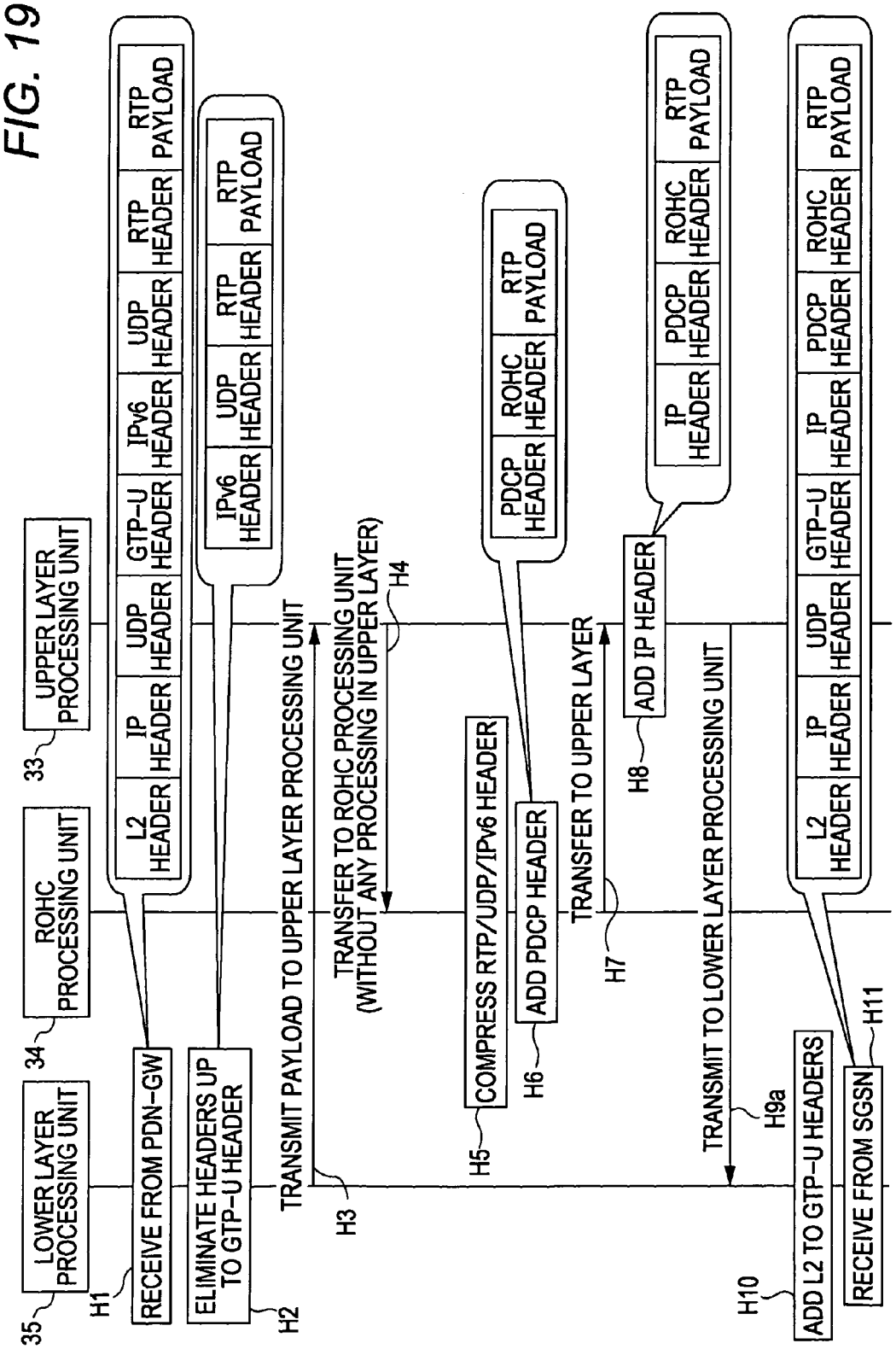

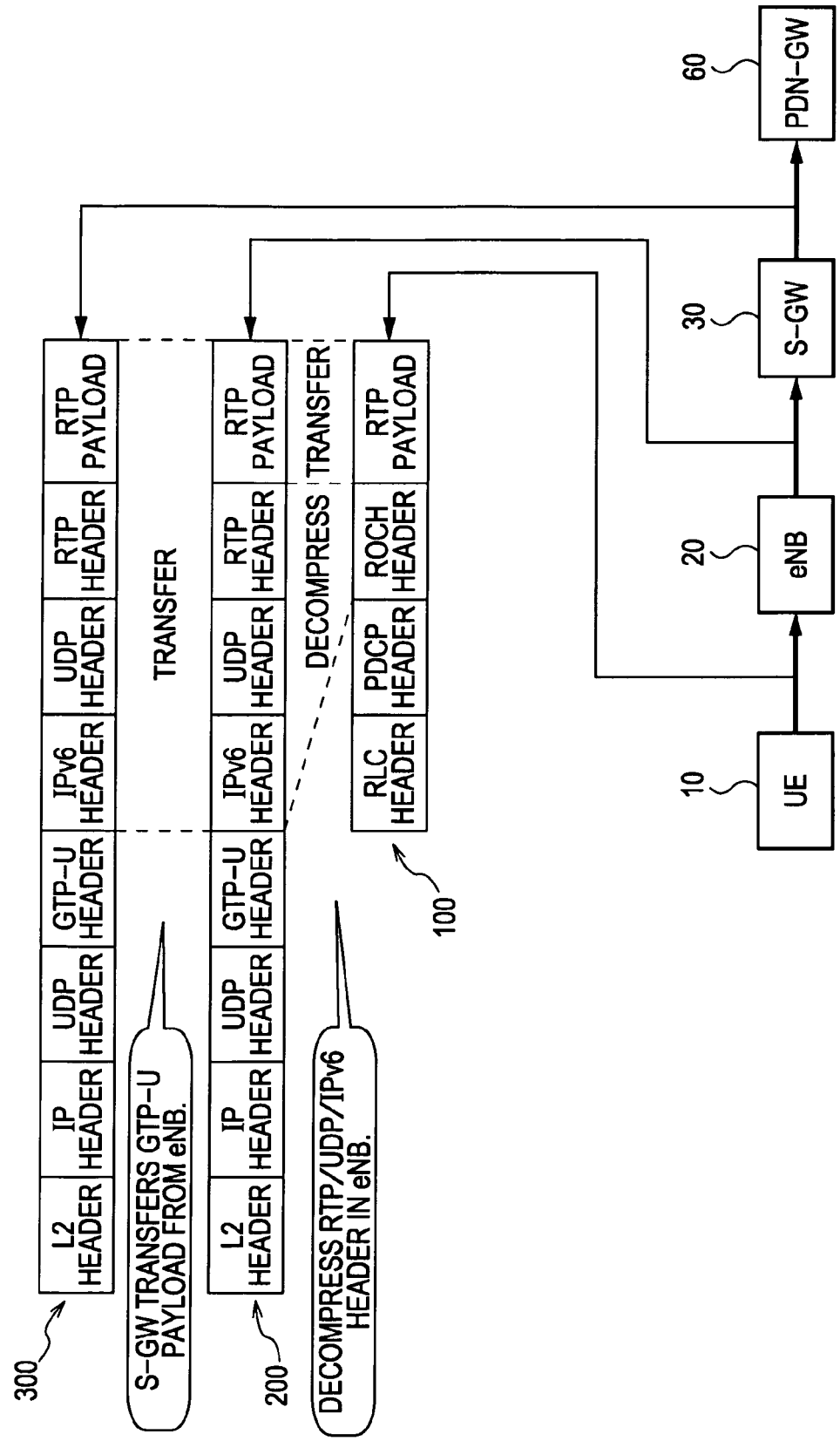

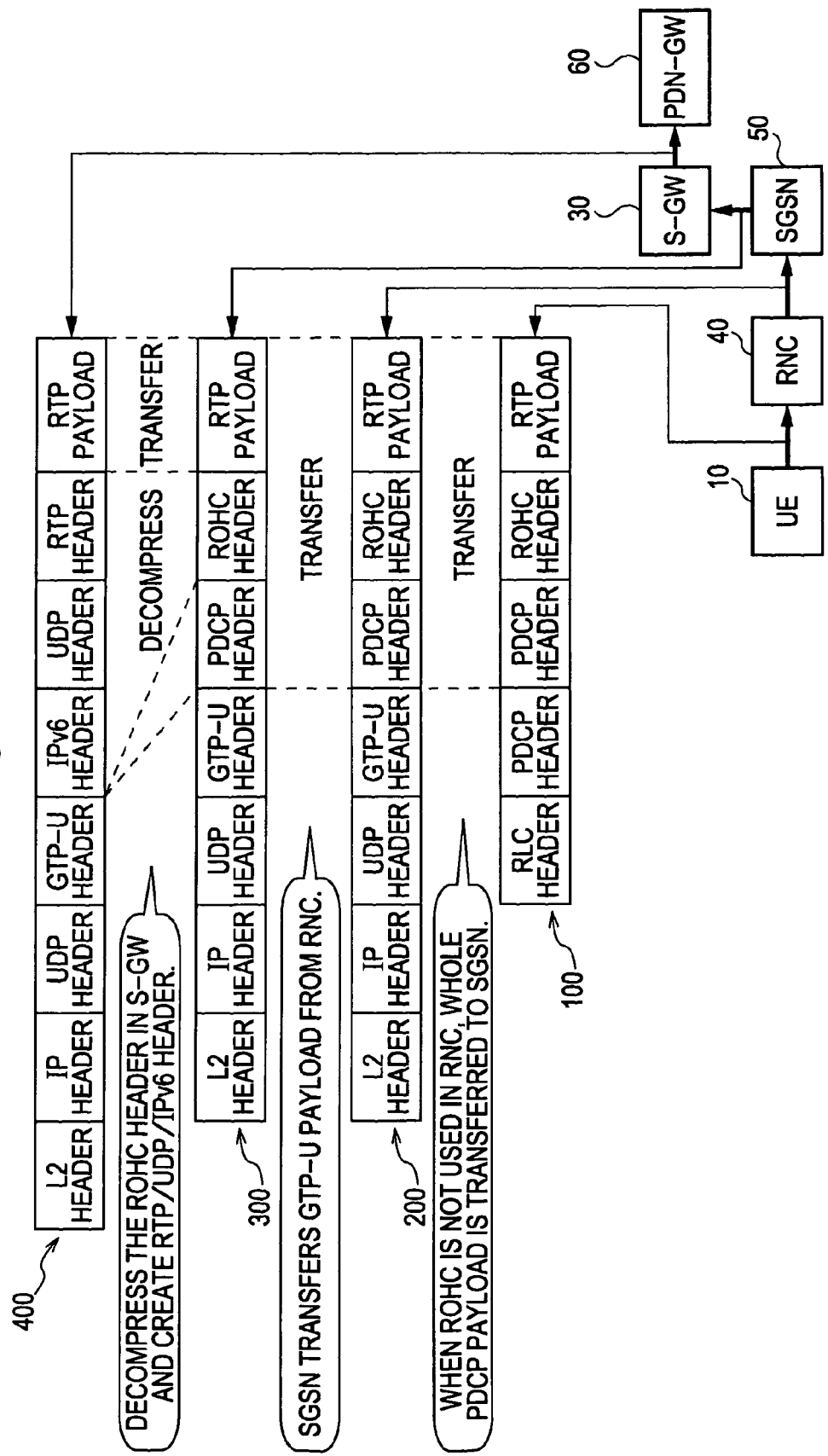

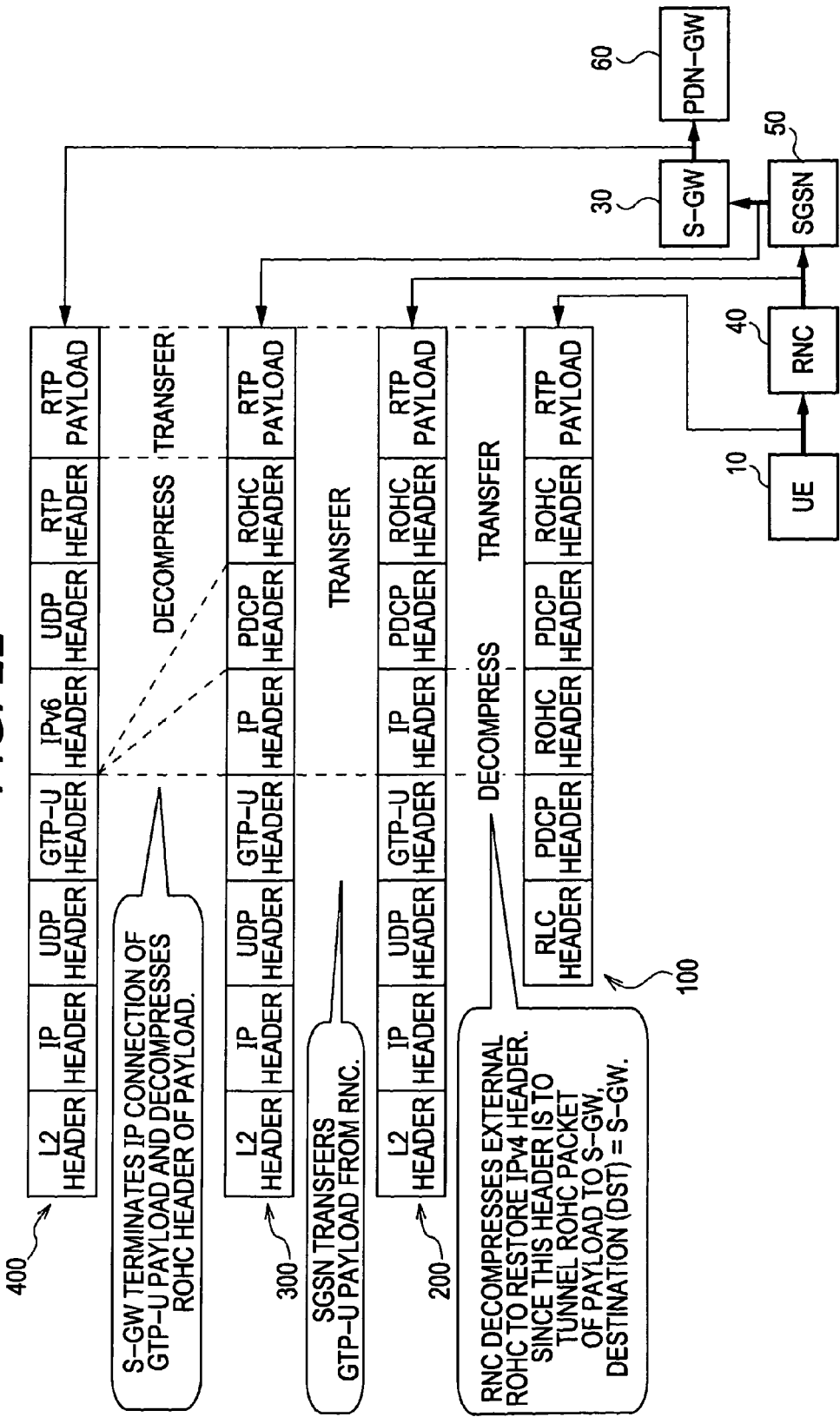

PACKET COMMUNICATION METHOD, PACKET COMMUNICATION SYSTEM, WIRELESS TERMINAL, AND PACKET COMMUNICATION DEVICE

CROSS-REFERENCE TO RELATED APPLICATIONS

The present invention claims priority to Japanese Patent Application No. JP 2007-279116, filed Oct. 26, 2007, the entirety of which is incorporated herein by reference.

BACKGROUND OF THE INVENTION

1. Technical Field

The present invention relates to a packet communication method, a packet communication system, a wireless terminal, and a packet communication device. The invention is preferable for use in, for example, packet communication in a next generation network.

2. Description of the Related Art

In the 3GPP, a next generation system (Release 8) which can accommodate various kinds of existing wireless access methods (access networks) and make core networks all-IP (All IP) networks is taken into consideration. The contents are described in the 3GPP TS 23.401 V1.2.1.

The next generation architecture taken into consideration here is called Systems Architecture Evolution (SAE). The wireless technique in the SAE is called LTE (Long Term Evolution).

In chapter 5.5.2.1 of the 3GPP TS 23.401 V1.2.1, the processing of a user terminal (UE: User Equipment) handing over from E-UTRAN (Evolved Universal Terrestrial Radio Access Network) to UTRAN in the SAE (E-UTRAN to UTRAN Iu mode Inter RAT (radio access technology) handover based on PS (Packet Switched) handover) is described. The E-UTRAN is described in the 3GPP TS 36.300 V8.2.0.

Japanese Laid-Open Patent Publication No. 2005-529554 discloses a technique about packet flow processing in a communication system. In this description, a resource reservation protocol (RSVP: Resource reSerVation Protocol) message includes information of a packet flow parameter for use in determining a packet flow processing method. The packet flow parameter information includes, for example, QoS (Quality of Service) of a packet flow and a header compression type to be used in the packet flow (for example, refer to the paragraphs 0051 to 0058 of Japanese Laid-Open Patent Publication No. 2005-529554).

One of the objects of the invention is to make it possible to continue processing according to a predetermined compression or decompression method before and after handover (HO) of a wireless terminal between different access networks.

Another object is to restrain from decreasing efficiency of resource use in a wireless zone between a wireless terminal and a wireless access network.

The invention is not defined by or restricted to the above objects but various functions and effects derived from each structure shown in the embodiments described later, that is, the functions and effects which cannot be obtained in the conventional technique can be defined as further objects.

SUMMARY

According to an aspect of certain embodiments, a packet communication system having a wireless terminal, a plurality of wireless access networks, and a packet communication device connected to the respective wireless access networks, that includes a unit controlling handover processing for handover of the wireless terminal to a different wireless access network. Also included is a unit checking whether a handover destination wireless access network supports a header compression or decompression method used in a first packet communication performed through a handover source wireless access network, at a time of handover. Also included is a unit controlling an execution point for the processing corresponding to the header compression or decompression method to be specified at the packet communication device for a second packet communication performed through the handover destination wireless access network, when the handover destination wireless access network does not support the header compression or decompression method.

BRIEF DESCRIPTION OF THE DRAWINGS

FIG. 1 is a block diagram showing an example of SAE architecture which certain aspects of the invention are adopted to;

FIG. 5 is a sequence view for describing the procedure of handover by the UE shown in FIG. 2;

FIG. 16 is a sequence view for describing the UL processing of the S-GW shown in FIG. 15 (ROHC non-encapsulation);

FIG. 17 is a sequence view for describing the UL processing of the S-GW shown in FIG. 15 (ROHC encapsulation);

FIG. 18 is a sequence view for describing the DL processing of the S-GW shown in FIG. 15 (ROHC non-encapsulation);

FIG. 19 is a sequence view showing the DL processing of the S-GW shown in FIG. 15 (ROHC encapsulation);

FIG. 20 is a view showing one example of the packet format in the UL packet transfer path before handover shown in FIG. 2;

FIG. 21 is a view showing one example of the packet format in the UL packet transfer path after handover (ROHC non-encapsulation) shown in FIG. 2; and FIG. 22 is a view showing one example of the packet format in the UL packet transfer path after handover (ROHC encapsulation) shown in FIG. 2.

DETAILED DESCRIPTION OF THE PREFERRED EMBODIMENTS

Hereinafter, embodiments of the invention will be described with reference to the drawings. The embodiments described below are not restrictive and it is intended not to exclude various modifications and applications which are not described below. Namely, the invention can be achieved by various modifications without departing from the scope.

[1] Outline

Figure 1:
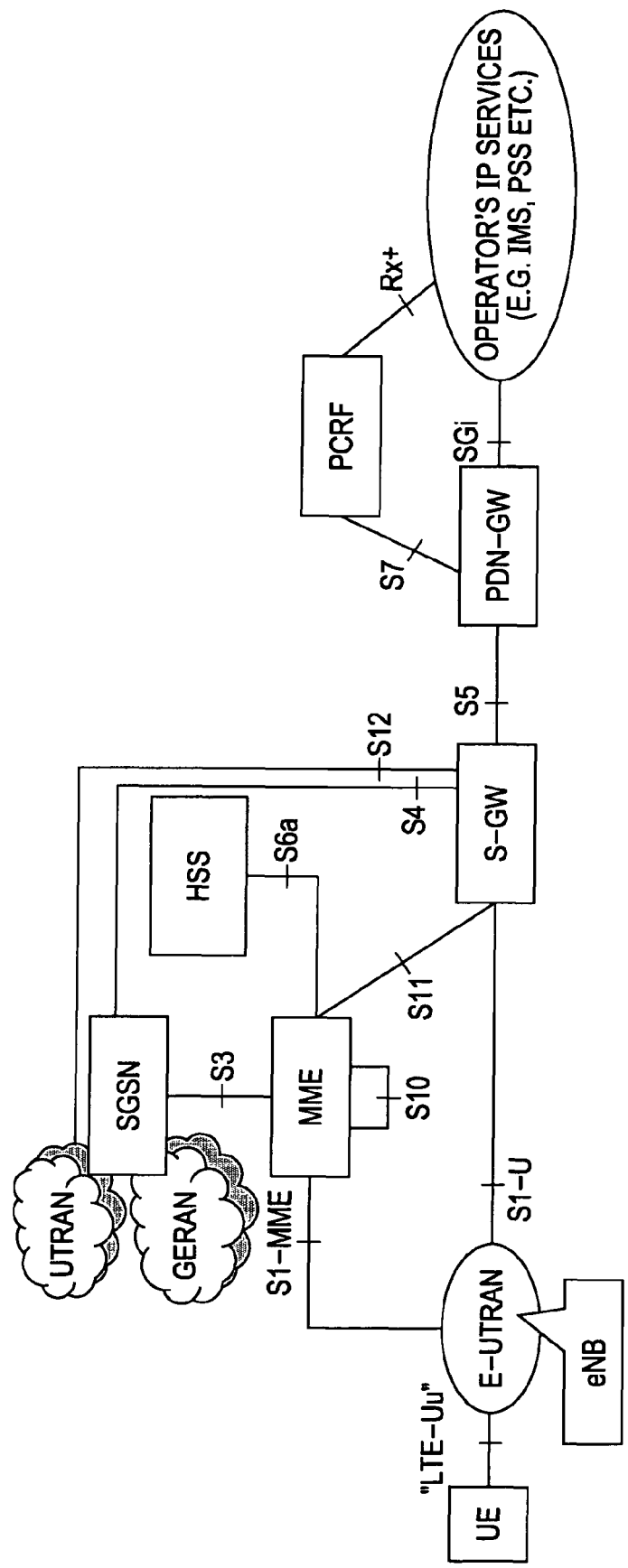

FIG. 1 is a block diagram showing an example of SAE architecture which certain embodiments of the invention are adopted to. FIG. 1 is a view corresponding to FIG. 4.2.1-1 (Non-Roaming Architecture for 3GPP Accesses) in the above mentioned 3GPP TS 23.401 V1.2.1.

As illustrated in FIG. 1, the SAE architecture is defined as a system including, for example, a user terminal (User Equipment: UE) as a wireless terminal, an E-UTRAN including an evolved NodeB (eNB) as a wireless station, an SGSN [Serving GPRS (General Packet Radio Service) Support Node], an HSS (Home Subscriber Server), an MME (Mobility Management Entity), an S-GW (Serving Gateway), a PDN-GW (Packet Data Network Gateway), a PCRF (Policy and Charging Rules Function), and a CSCF (Call Session Control Function, for example in the IMS).

The UE has a wireless interface, to connect with the eNB in the eNB service area via a wireless link and may communicate with another UE and server through this eNB. The wireless link includes uplink (UL) in the direction from the UE to the eNB and downlink (DL) in the opposite direction. The UE includes, but is not limited to, a cell phone, PDA, notebook PC, and the like. Alternatively, the UE may be a communication terminal which is connected to an eNB through a wired interface. In the following examples the interface between the eNB and UE will be discussed as a wireless interface, however, as pointed out above a wired interface is also contemplated.

The eNB is an entity (node) which terminates the wireless interface with the UE, receiving a wireless packet from the UE and transmitting a wireless packet to the UE. The eNB corresponds to an entity which integrates a wireless base station (Base Station: BS) and one of the RNC (Radio Network Controller) function, which are the constitutional elements of the UTRAN, GERAN (Enhanced Data Rates for GSM Radio Access Network), UMTS (Universal Mobile Telecommunications System), GPRS (General Packet Radio Service) network, and other wireless access networks before the third generation (hereinafter, sometimes generally referred to as the existing network).

The HSS is a server having a database which collectively manages user information such as information on user identity and position of the UE.

The MME (management device) is an entity (logical node) which manages the position of the UE (mobility) and the bearer and performs NAS (Non-Access-Stratum) signaling in cooperation with the HSS.

The SGSN is a node which is provided to connect with a wireless access network such as UTRAN and GERAN (specifically, an RNC that is one of its components) in the GPRS environment. The SGSN grasps the position of the UE in cooperation with the MME and provides a security function and an access control to the UE.

The S-GW (packet communication device) is an entity that becomes an interface to the E-UTRAN and the SGSN. The S-GW receives and transmits a user packet between itself and the eNB of the E-UTRAN and between itself and the RNC of the UTRAN or the GERAN through the SGSN.

The PDN-GW is a control gate (gateway) node which terminates the interface to the PDN (Packet Data Network). The PDN includes the Internet, a network within an operator, a private packet data network, a packet data network between operators (for providing an IMS (IP Multimedia Subsystem) service and a PSS (Packet-switched Streaming Service)), and the like. The PDN-GW may be provided as a single node, being integrated with the S-GW, in some cases.

The PCRF is an entity (logical node) which manages and controls various kinds of policies such as QoS (Quality of Service) of the bearer and accounting, according to a request from an entity (logical node) that, manages and controls a session (bearer) in the IMS, which is called a CSCF (Call Session Control Function). The CSCF is included in the IMS. The CSCF is realized by, for example, one function of an application server such as the IMS server that is one of the PDN components.

In FIG. 1, "LTE-Uu", "S1-U", "S1-MME", "S3", "S4", "S5", "S6a", "S7", "S11", "S12", "SGi", and "Rx+" indicate each interface name between nodes (entities) ("S10" indicates an interface within the MME).

More specifically, the "LTE-Uu" designates an interface name between the UE and the eNB, the "S1-U" designates an interface name between the eNB and the S-GW, the "S1-MME" designates an interface name between the eNB and the MME, the "S3" designates an interface name between the MME and the SGSN, and the "S4" designates an interface name between the SGSN and the S-GW.

The "S5" designates an interface name between the S-GW and the PDN-GW, the "S6a" designates an interface name between the MME and the HSS, the "S7" designates an interface name between the PDN-GW and the PCRF, the "S11" designates an interface name between the MME and the S-GW, the "S12" designates an interface name between the component of the UTRAN and the S-GW, the "SGi" designates an interface name between the PDN-GW and the PDN (CSCF), and the "Rx+" designates an interface name between the PDN(CSCF) and the PCRF.

In this SAE architecture, assume the case, for example, where a UE which makes communication through access to an eNB (wireless access point) of a wireless access network (E-UTRAN) via a wireless link and then moves to a service area of the UTRAN or the GERAN that is another wireless access network and changes the connection destination to a wireless base station (BS: Base Station)(wireless access point) in the service area provided by the UTRAN or the GERAN, in short, the case of handover (Inter RAT handover).

Figure 2:
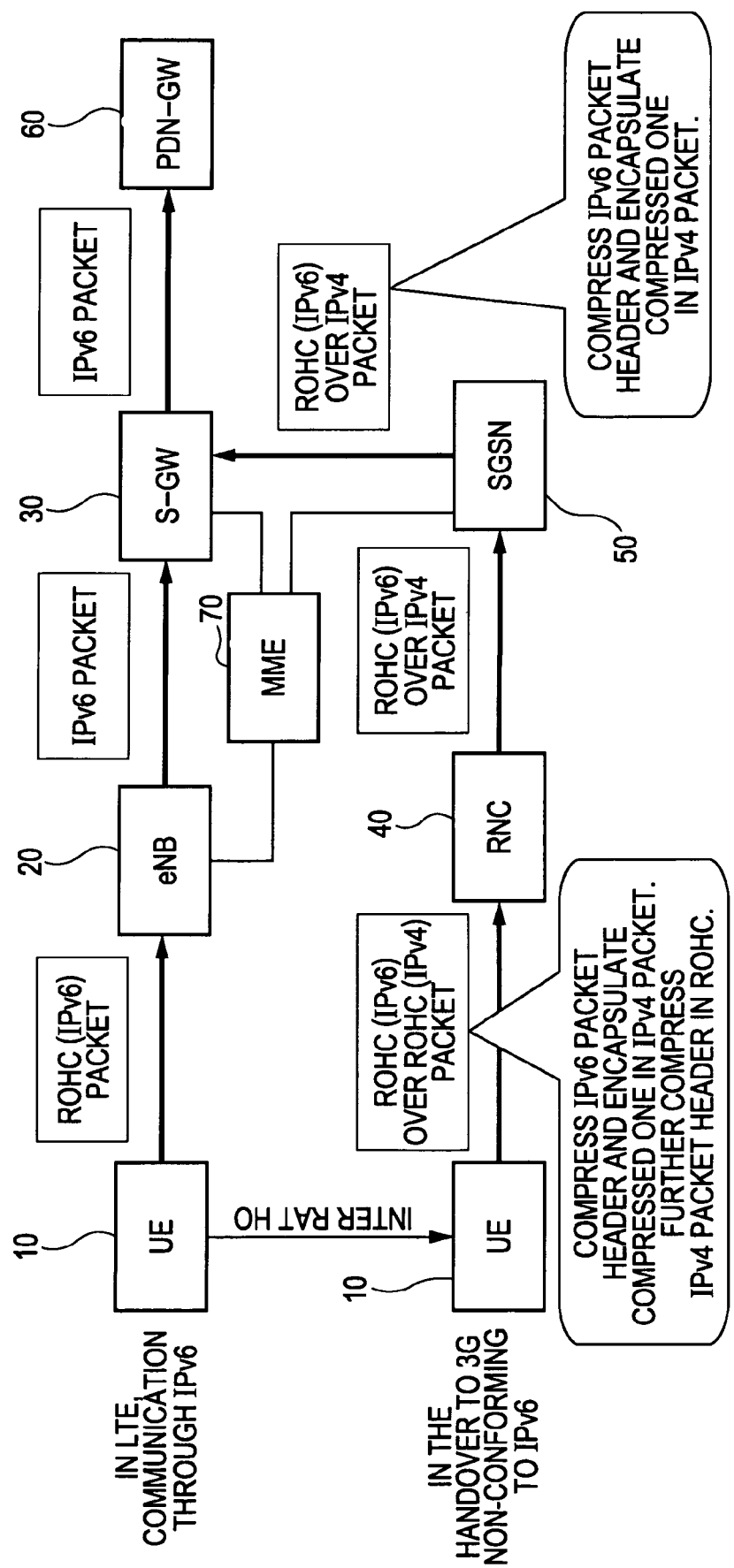
FIG. 2 is a view showing a transfer path (packet flow) of an uplink (UL) user packet before handover and a UL packet flow after handover in the SAE architecture.

In this case, the uplink (UP) transfer path (packet flow) of data (namely, user packet) in a user plane (U-plane) before handover and the UL transfer path (packet flow) after handover are respectively shown, for example, as indicated in FIG. 2.

The UL user packet transmitted from the UE 10 before handover is transferred to the S-GW 30 through the eNB 20 and further transferred from the S-GW 30 to the PDN-GW 60. The UL user packet transmitted from the UE 10 after handover is transferred to the S-GW 30 through the RNC 40 and the SGSN 50 and further transferred from the S-GW 30 to the PDN-GW 60. In other words, the packet flow before handover and the packet flow after handover merge into the S-GW 30, which is connected to the PDN-GW 60.

The UE 10 is not connected directly to the RNC 40 but makes communication through a BS under the control of the RNC 40. In FIG. 2, the BS (wireless access point) intervening between the UE 10 and the RNC 40 is not illustrated for the sake of simplification. In the following description, expressions will be used as if the UE 10 were directly connected to the RNC 40 for convenience, but it actually means a connection through the BS. In FIG. 2, a space between the UE 10 and the eNB 20 is a wireless zone and a space between the UE 10 and the BS (part of an area between the UE 10 and the RNC 40) is a wireless zone.

In the wireless zone, it is important to use the resources effectively. Therefore, it is preferable that a header compression technique called ROHC (RObust Header Compression) is used to comoress the header of a wireless packet, in the communication (packet flow) of the wireless zone. In the ROHC, a header of user data accommodated in a payload of the PDCP (Packet Data Convergence Protocol) packet is dynamically compressed.

For example, when the user data is of the RTP (Real Time Protocol) packet type in VoIP (Voice over Internet Protocol) communication, the IPv6 header, the UDP (User Datagram Protocol) header, and the RTP header are to be compressed. The compressed headers are added to the head of the RTP payload as a ROHC header.

When the protocol of an ROHC of the same level is not supported in all the entities (the eNB 20, the RNC 40, and the SGSN 50) positioned on the respective paths of the packet transfer having different paths before and after handover, in the communication as mentioned above (when the same compression technique cannot be continued), the UE may fail in continuing a proper communication before and after handover. In this case, there is a possibility of decreasing the efficiency of resource use in the wireless zone caused by the header compression.

For example, in the entity (eNB 20) of the E-UTRAN that is the wireless access network of a handover (HO) source, an RTP profile supports the ROHC with the IP header of IPv6 packet (hereinafter, referred to as ROHC (IPv6/RTP)) as a first header compression or decompression method. In the entity (RNC 40) of the UTRAN or the GERAN that is the wireless access network of a handover destination, assume an environment in which the ROHC (IPv6/RTP) is not supported, but the RTP profile supports an ROHC with an IPv4 IP header (hereinafter, referred to as ROHC (IPv4/RTP)) as a second header compression or decompression method. Further, assume that the UE 10 supports at least a communication function with IPv6. The information about the supporting situation is kept and managed by the MME 70 as mentioned later. That is the MME 70 keeps and manages the support environment of the entities.

In this case, the UE 10 performs a packet communication through the eNB 20 using IPv6 when it is positioned in the service area of the E-UTRAN. At that time, the UE 10 performs the header compression on the IPv6 packet according to the ROHC (IPv6/RTP) in order to improve the resource use efficiency in the wireless zone (wireless link).

When the eNB 20 receives the packet having the header compressed (hereinafter, also referred to as a compression packet), the eNB 20 performs the header decompression processing corresponding to the ROHC (IPv6/RTP) to restore the IPv6 packet. A header necessary to pass through the interfaces (S1-U and S5, shown in FIG. 1) to the S-GW 30 and the PDN-GW 60 is added to the restored IPv6 packet in the eNB 20 and transferred to the PDN-GW 60 through the S-GW 30.

On the other hand, even after handover, it is preferable that the UE 10 continues to perform the header compression on the UL IPv6 packet according to the ROHC (IPv6/RTP) in order to improve the resource use efficiency in the wireless zone. When the RNC 40 of the handover destination TA does not support the ROHC (IPv6/RTP), the RNC 40 cannot perform the decompression processing of the ROHC (IPv6/RTP) header when receiving the compression packet from the UE 10 and cannot restore the IPv6 packet to be transferred to the S-GW 30. As a result, the UE 10 cannot maintain the use of same type of compression scheme after the handover.

When same type of compression scheme is not available at the handover target network, for example, a method of the UE 10's transmitting a packet without header compression of the ROHC (IPv6/RTP) is taken into consideration but the resource use efficiency is decreased in the wireless zone.

In this example, with respect to the UL compression packet after handover, a header decompression point (node) of the ROHC (IPv6/RTP) is set in the S-GW 30 that is the node for processing both packet flows before and after handover and a tunnel is created in the packet transfer path up to the S-GW 30.

For example, at the time of handover, the MME 70 notifies the UE 10 and the S-GW 30 that the header decompression point (node) of the UL ROHC (IPv6/RTP) becomes the S-GW 30. At that time, it also notifies them at least of parameters concerning ROHC processing (hereinafter, referred to as a ROHC parameter). The information (tunnel starting instruction, address information of the S-GW 30, and the like) about a tunnel to the header decompression point is notified from the MME 70 to the UE 10.

The above notification may be directly made from the MME 70 to the UE 10 and the S-GW 30 and it may be indirectly made through other entities. In the indirect case, the notification can be made by using a control message which is transferred in the process of handover between the eNB 20 and the MME 70, the MME 70 and the SGSN 50, and the SGSN 50 and the S-GW 30, for example, as described later in FIG. 5. The UE 10 can be notified through the SGSN 50 and the RNC 40, and the S-GW 30 can be notified through the SGSN 50.

Upon receipt of the notification (ROHC parameters), the UE 10 compresses the IPv6 packet header in the handover destination TA according to the ROHC (IPv6/RTP) and encapsulates the compression packet in a lower layer packet (IP and the like) with the S-GW 30 set as the destination (tunnel destination) depending on necessity (the compression packet is regarded as payload and a header of the lower layer protocol (IP and the like) is added there). Namely, it is converted into a tunnel packet having the destination of the header decompression point of the ROHC (IPv6/RTP). Depending on the necessity, the header of the tunnel packet is further compressed according to the ROHC (IPv4/RTP) and transmitted to the RNC 40.

In the RNC 40 where the ROHC (IPv4/RTP) is supported but the ROHC (IPv6/RTP) is not supported (the header compressed IPv6 packet cannot be decompressed), since the packet received from the UE 10 is encapsulated in the tunnel packet, the header before compression can be restored while decompressing the ROHC header of the tunnel packet depending on necessity according to the ROHC (IPv4/RTP) and transferred (tunneled) to the destination (S-GW 30) indicated by the header. In the S-GW 30, the encapsulated tunnel packet is decapsulated to take out the ROHC (IPv6/RTP)

packet and the header of the ROHC packet is decompressed and restored according to the ROHC (IPv6/RTP) processing.

As mentioned above, as the case of encapsulating the packet compressed according to the ROHC (IPv6/RTP) further in the lower layer packet such as IP as a tunnel, there is, for example, the case in which the entity (RNC 40 and SGSN 50) of the handover destination TA assumes the lower layer packet (IP and the like) as the payload of the received user packet. There may be the case in which the lower layer packet is used in order to negotiate the ROHC properly between the UE 10 and the S-GW 30 (in the ROHC, negotiation of the ROHC parameter is to be performed in the lower layer if necessary).

When the entity of the handover destination TA does not request any lower layer packet (IP and the like) as the user packet but it may transfer the ROHC packet which is to be transferred to the S-GW 30, to the S-GW 30 as it is and when negotiation at the ROHC start between the UE 10 and the S-GW 30 is not necessary, a tunnel is not necessary in the lower layer packet. It may be encapsulated into the PDCP packet instead of the IP packet. In this case, the payload of the PDCP packet received by the eNB 20 is a target for ROHC termination in the S-GW 30.

Further, when the RNC 40 does not support the RCHC function itself or it supports the ROHC (IPv4/RTP) but sets the function OFF since it can be set invalid (OFF), the UE 10 does not have to encapsulate the ROHC (IPv6/RTP) packet header-compressed according to the ROHC (IPv6/RTP) into the IPv4 packet.

Figure 3:
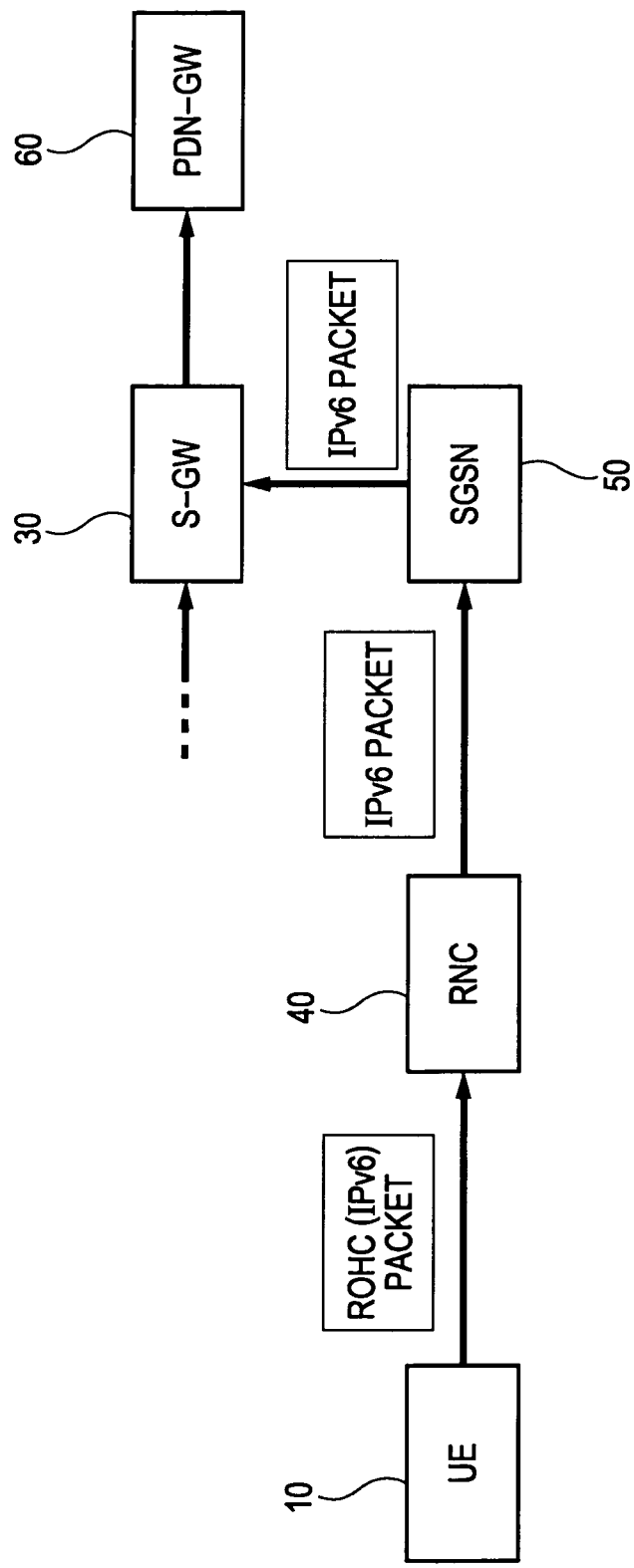
FIG. 3 is a view showing a transfer path (packet flow) of an uplink (UL) user packet after handover in the SAE architecture.

When the RNC 40 supports the ROHC (IPv6/RTP), for example, as illustrated in FIG. 3, similarly to the packet transfer path (eNB 20) before handover, a header of the compression packet of the IPv6 transmitted by the UE 1.0 is decompressed in the RNC 40 and the packet before the header compression is restored and transferred to the S-GW 30 through the SGSN 50. The above instruction from the MME 70 does not have to be made.

Although the above processing concerns the UL packet flow, basically the opposite processing to the above will be performed in the DL packet flow. Namely, in the above mentioned processing, the processing with the S-GW 30 exchanged for the UE 10 and vice versa will be performed. With respect to the DL packet flow from the S-GW 30 to the UE 10, the header compression (decompression) point of the ROHC (IPv6/RTP) becomes the S-GW 30 (UE 10), the encapsulation is performed in the S-GW 30, and the decapsulation is performed in the UE 10.

Considering both UL and DL, the MME 70 sets the header decompression point of the ROHC (IPv6/RTP) in the UL packet flow after handover and the header compression point of the ROHC (IPv6/RTP) in the DL packet flow after handover respectively in the S-GW 30.

Figure 4A:
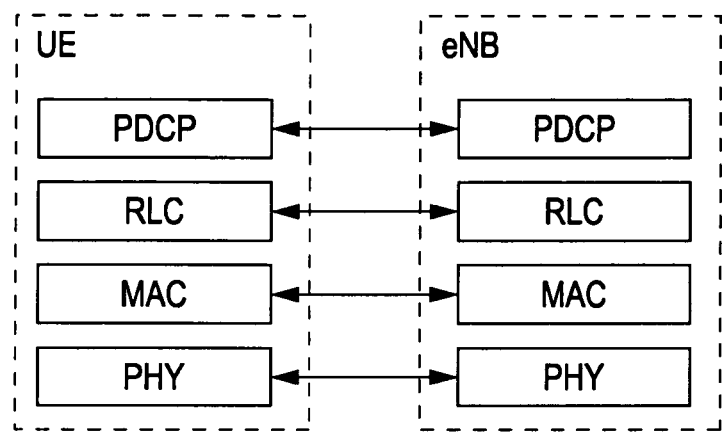
FIG. 4A is a view showing one example of a protocol stack in the user plane and FIG. 4B is a view showing one example of the protocol stack in the user plane in the S1 interface.
Figure 4B:
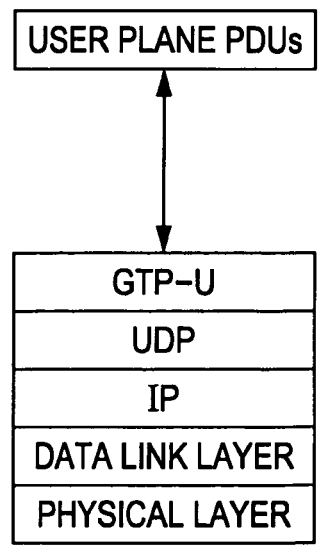

FIG. 4A shows an example of a protocol stack used in a user plane between the UE 10 and the eNB 20 (similarly in the case of the UMTS), and FIG. 4B shows an example of a protocol stack used in a user plane between the eNB 20 and the S-GW 30 (similarly between the SGSN 50 and the S-GW 30). FIG. 4A corresponds to FIG. 4.3.1 of the above mentioned 3GPP TS 36.300 V8.2.0 and FIG. 4B corresponds to FIG. 19.1 of the 3GPP TS 36.300 V8.2.0.

When performing the encapsulation (tunnel transfer) in the IP base, each IP packet is stored as the payload of the PDCP layer packet shown in FIG. 4A and as the payload of the GTP-U layer packet shown in FIG. 4B and the ROHC packet belonging to the PDCP layer is stored in the payload of the IP packet. The GTP means the abbreviation of GPRS (General Packet Radio Service) Tunneling Protocol and the GTP-U means the GTP used for a data transfer (tunnel) in the user plane (U-plane).

According to this, the SGSN 50, the eNB 20, and the RNC 40 can perform proper packet processing in the protocol base of the lower layer without any special change of function, independent of the data contents stored in the payload of the packet in the lower layer.

FIG. 20 shows an example of the packet format in the UL packet transfer path before handover shown in FIG. 2. FIG. 21 shows an example of the packet format in the UL packet transfer path after handover when the UE 10 shown in FIG. 2 does not encapsulate the ROHC (IPv6/RTP) packet in the lower layer packet. FIG. 22 shows an example of the packet format in the UL packet transfer path after handover when the UE 10 shown in FIG. 2 encapsulates the ROHC (IPv6/RTP) packet in the lower layer packet.

In the example shown in FIG. 20, the UE 10, before handover, stores the user data in the RTP payload, assuming that the user data packet is the RTP packet of VoIP communication and the like. To this RTP payload, the IPv6 header, the UDP header, and the RTP header (hereinafter, abbreviated as RTP/UDP/IPv6 header) are added, to create an IPv6 packet to be stored in the PDCP payload. The RTP/UDP/IPv6 header of the IPv6 packet is compressed according to the header compression of the ROHC (IPv6/RTP) as a ROHC (IPv6/RTP) header.

The PDCP header is added to the ROHC packet formed by the ROHC header and the RTP payload, to create a PDCP packet, further the RLC (Radio Link Control) header is added thereto to create an RLC packet (refer to the symbol 100), and this is transmitted to the eNB 20 as a UL packet.

Upon receipt of the RLC packet, the eNB 20 terminates the RLC header and extracts the RLC payload, and terminates the PDCP header of the PDCP packet included in this RLC payload and extracts the ROHC (IPv6/RTP) packet.

The ROHC (IPv6/RTP) header is decompressed according to the ROHC (IPv6/RTP), to restore the IPv6 header, the UDP header, and the RTP header, hence to restore the IPv6 packet, to which the header (GTP-U header, UDP header, IP header, and L2 header) of the lower layer protocol necessary for transfer to the PDN-GW 60 is added (refer to the symbol 200) and then transferred to the S-GW 30. Adding the GTP-U header means that the PDCP payload (ROHC packet) is changed for use in a GTP-U connection to the PDN-GW 60. The L2 header means the header of the layer 2 (data link layer).

The S-GW 30 analyzes the header information of the packet transferred from the eNB 20, specifies the transfer destination (PDN-GW 60), and transfers the received packet to the PDN-GW 60 (refer to the symbol 300).

On the other hand, in the example shown in FIG. 21, the UE 10, after handover, creates the PDCP packet (refer to the symbol 100), similarly to the processing before handover, and transmits this to the RNC 40 as the UL packet as it is (without encapsulation).

The RNC 40 terminates the RLC header of the RLC packet received from the UE 10 and extracts the RLC payload, and terminates the PDCP header of the PDCP packet included in the RLC payload and extracts the ROHC (IPv6/RTP) packet.

The header (GTP-U header, UDP header, IP header, and L2 header) of the lower layer protocol necessary for transfer to the S-GW 30 is added to the extracted ROHC (IPv6/RTP) packet (refer to the symbol 200) and transferred to the SGSN 50. Namely, the PDCP payload (ROHC packet) is changed for use in a GTP-U connection to the S-GW 30.

The SGSN 50 analyzes the header information of the packet transferred from the RNC 40, specifies the transfer destination (S-GW 30), and transfers the received packet to the S-GW 30 (refer to the symbol 300).

The S-GW 30 decompresses the header of the ROHC (IPv6/RTP) packet included in the payload of the packet received from the SGSN 50 according to the ROHC (IPv6/RTP), to restore the RTP/UDP/IPv6 header of the IPv6 packet and transfers it to the PDN-GW 60 (refer to the symbol 400).

On the contrary, in the example shown in FIG. 22, the UE 10, after handover, creates a PDCP packet in which the ROHC packet whose header is compressed according to the ROHC (IPv6/RTP) is included in the PDCP payload. This is encapsulated in a lower layer packet (for example, IPv4) with the S-GW 30 set as the destination (tunnel destination), and the header of the packet (IPv4 header) is compressed according to the ROHC (IPv4/RTP), hence to form a ROHC (IPv4/RTP) header.

The PDCP header is added to the ROHC (IPv4/RTP) packet formed by the ROHC (IPv4/RTP) header and the PDCP packet (IPv4 payload), hence to form a PDCP packet, to which the RLC header is further added, hence to form an RLC packet (refer to the symbol 100), and this is transferred to the RNC 40 as a UL packet.

Upon receipt of the RLC packet from the UE 10, the RNC 40 terminates the RLC header and extracts the RLC payload, and it terminates the PDCP header of the PDCP packet included in the RLC payload and extracts the PDCP payload, that is, the ROCH (IPv4/RTP) packet.

By restoring the IPv4 header after decompressing the ROHC (IPv4/RTP) header of the extracted ROHC (IPv4/RTP) packet according to the ROHC (IPv4/RTP), an IPv4 packet is created, the header (GTP-U header, UDP header, IP header, and L2 header) of the lower layer protocol necessary for transfer to the S-GW 30 is added to the IPv4 packet (refer to the symbol 200) and transferred to the SGSN 50. Namely, after the ROCH (IPv4/RTP) packet included in the PDCP payload is restored in the IPv4 packet, it is changed for use in the GTP-U connection to the S-GW 30.

The SGSN 50 analyzes the header information of the packet transferred from the RNC 40, specifies the transfer destination (S-GW 30), and transfers the received packet to the S-GW 30 (refer to the symbol 300).

The S-GW 30 terminates the header of the IPv4 packet included in the payload of the packet received from the SGSN 50 (terminates the IP connection), further terminates the PDCP header, and decompresses the ROHC (IPv6/RTP) header included in the PDCP payload according to the ROHC (IPv6/RTP), to restore the header of the IPv6 packet (IPv6 header, UDP header, and RTP header), which is transferred to the PDN-GW 60 (refer to the symbol 400).

With respect to the DL, the processing becomes opposite to the processing shown in FIG. 20, FIG. 21, and FIG. 22; the header addition in the UL processing corresponds to the header elimination in the DL, the header termination (elimination) in the UL corresponds to the header addition in the DL, the header decompression in the UL corresponds to the header compression in the DL and vice versa.

Next, a method of notifying the ROHC parameter from the MME 70 to the UE 10 and the S-GW 30 at handover of the UE 10 will be described. For example, a message used in the procedure when the UE 10 hands over from the eNB 20 of the E-UTRAN to the RNC 40 of the existing network, as shown in FIG. 5, can be used for this notification.

FIG. 5 corresponds to a view of integrating and simplifying FIG. 5.5.2.1-1 (E-UTRAN to UTRAN Iu mode Inter RAT handover, preparation phase) and FIG. 5.5.2.1-2 (E-UTRAN to UTRAN Iu mode Inter RAT handover, execution phase) of the above mentioned 3GPP TS 23.401 V1.2.1. For example, the procedure about the packet forwarding path establishment and position registration is omitted.

In the handover procedure shown in FIG. 5, for example, a relocation command message transmitted from the MME 70 to the eNB 20 (Step S7) and a handover command message transmitted from the eNB 20 to the UE 10 (Step S8) can be used for notifying the UE 10 of the ROHC parameter.

On the other hand, a forward relocation complete acknowledge message transmitted from the MME 70 to the SGSN 50 (Step S13) and an update bearer request message transmitted from the SGSN 50 to the S-GW 30 (Step S14) can be used for notifying the S-GW 30 of the ROHC parameter.

In other words, when the eNB 20 judges that the handover to another wireless base station (here, the RNC 40) is necessary based on, for example, the electric wave receiving intensity from the UE 10 and it decides to start handover processing (Step S1), it issues a relocation required message to the MME 70 (Step S2).

By receiving the relocation required message, the MME 70 can recognize the handover destination TA (RNC 40) of the UE 10 and check whether the ROHC processing can be continued or not in the handover destination TA. The MME 70 previously preserves (stores) the information about the ROHC support situation of the entity of the handover destination TA where the UE 10 is able to hand over according to the shift (mobility) of the UE 10.

When it is judged that the ROHC processing cannot be continued (the RNC 40 does not support the ROHC (IPv6/RTP)), the MME 70 performs a negotiation necessary for preparing for the handover with the entity (RNC 40) of the handover destination TA (Steps S3 to S6). After the handover is prepared, the MME 70 transmits the relocation command message to the entity (eNB 20) of the handover source TA of the UE 10 (Step S7). The MME 70 transmits the relocation command message including the ROHC parameter.

Upon receipt of the relocation command message, the eNB 20 transmits a handover command message instructing handover, to the UE 10 (step S8). The eNB 20 includes in this message the ROHC parameter which has been set in the received relocation command message.

Upon receipt of the handover command message, the UE 10 starts the access procedure (the procedure of the lower layer) to the handover destination TA (Step S9), and when the handover is completed, it transmits a handover complete message to that effect to a handover destination access network (RNC 40) (Step S10).

Upon receipt of the handover complete message, the RNC 40 transmits a forward relocation complete message to the SGSN 50 (Step S11). Receiving the message, the SGSN 50 transmits (transfers) the forward relocation complete message to the MME 70 and notifies the completion of the handover to the MME 70 (Step S12).

The MME 70 transmits an acknowledgement (Forward Relocation Complete Acknowledge) message in reply to the received forward relocation complete message to the SGSN 50 (Step S14). The MME 70 includes the ROHC parameter in this acknowledgement message.

Upon receipt of the above acknowledgement message, the SGSN 50 transmits to the S-GW 30 an update bearer request message which requests an update of the bearer setting for the UE 10. The SGSN 50 includes the ROHC parameter which has been set in the acknowledgement message received from the MME 70, in this message. Thus, the ROHC parameter is notified to the S-GW 30.

After receiving the update bearer request message and updating the bearer setting for the UE 10, the S-GW 30 transmits an update bearer response message to the SGSN 50 of a request source (Step S15). The MME 70 performs the releasing processing of the resource assigned to the eNB 20 of the handover source TA (Step S16), through the update of the bearer setting.

Although not shown in FIG. 5, in the handover procedure, a message may be transmitted from the SGSN 50 to the S-GW 30 in an earlier stage than Step S14, in some cases. In this case, the message may be used for the notification of the ROHC parameter.

For example, when there is no direct transfer path for forwarding the packet data during the handover, between the eNB and the UE 10, a message (Create Bearer Request message) for creating a forwarding path through the S-GW 30 is transmitted from the SGSN 50 to the S-GW 30. This Create Bearer Request message may contain the ROHC parameter.

[2] Examples

Hereinafter, the structures (functions) and operations of the MME 70, the UE 10, and the S-GW 30 for realizing the above operations will be described. As the other entities (eNB 20, RNC 40, SGSN 50, and PDN-GW 60) do not require any special change, their description is omitted.

(2.1) MME

Figure 6:
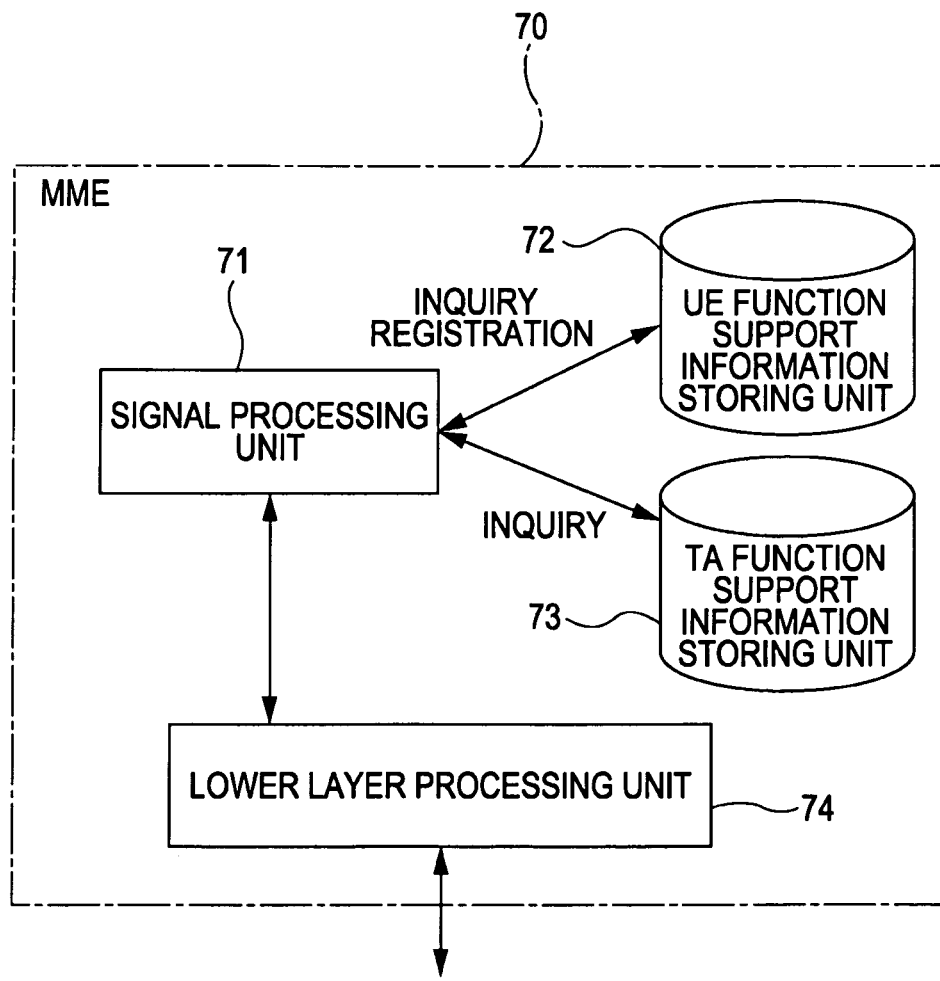
FIG. 6 is a block diagram showing the structure of an MME according to one embodiment.

FIG. 6 is a block diagram showing the structure of the MME according to an embodiment. The MME (management device) 70 shown in FIG. 6 includes a signal processing unit 71, a UE function support information storing unit 72, a TA function support information storing unit 73, and a lower layer processing unit 74.

The UE function support information storing unit 72 is to store and manage the information (UE function support situation information) about the functions supported by the UE 10 (ROHC (IPv6/RTP)/ROHC (IPv4/RTP) processing function, a function of encapsulating the packet header compressed through the ROHC (IPv6/RTP) in the IPv4 packet, and the like). The information about this support situation is obtained and registered in advance at least before the UE 10 performs a handover. For example, a message concerning position registration when the UE 10 gains access to (attaches) a network after power on can be used to notify the MME 70 of the UE function support situation information.

The TA function support information storing unit 73 is to store and manage the support situation information (TA function support situation information) including the information about the ROHC (IPv6/RTP)/ROHC (IPv4/RTP) supported at least by the TA, by the unit of wireless access network (TA) where the UE 10 can hand over to. Preferably, this TA function support situation information is registered at the time of, for example, building a network.

The position of the UE 10 is registered when it shifts from a TA to another TA, which is why the support situation information is stored and managed by the unit of TA. The unit of the support situation information stored and managed may be properly changed according to the method (timing) of registering the position of the UE 10.

The signal processing unit 71 has a function of creating and transferring a control message transferred in a control plane (C-plane). The control message contains the message concerned about the relocation for use in the handover process as mentioned in FIG. 5. Namely, the signal processing unit 71 has a function as handover control unit controlling the processing in which the UE 10 hands over to a different wireless access network.

In this example, as mentioned above, the signal processing unit 71 contains the setting information (ROHC parameter and the like) of the execution point of the ROHC (IPv6/RTP) processing (header decompression/compression) to be notified to the UE 10, in the relocation command message and contains the setting information (ROHC parameter and the like) of the execution point of the ROHC (IPv6/RTP) to be notified to the S-GW 30, in the update bearer request message.

The signal processing unit 71 of this example has a function of checking whether the ROHC (IPv6/RTP) processing can be continued or not and whether the execution point of the ROHC (IPv6/RTP) can be changed or not, upon receipt of the relocation request message through the lower layer processing unit 74 (refer to Step S2 in FIG. 5), according to the contents of the above message, the UE function support situation information, and the TA function support situation information. The signal processing unit 71 creates the relocation command message and update bearer request message if possible.

The lower layer processing unit 74 has an interface such as "S1-MME" and "S3" (see FIG. 1) as mentioned above, and through the interface it performs the processing (message packet assembly/disassembly and transmitting/receiving processing) on the control message (packet) transferred between the eNB 20 and the SGSN 50 through the interface, in a lower layer below the layer whose message is handled by the signal processing unit 71.

Figure 7:
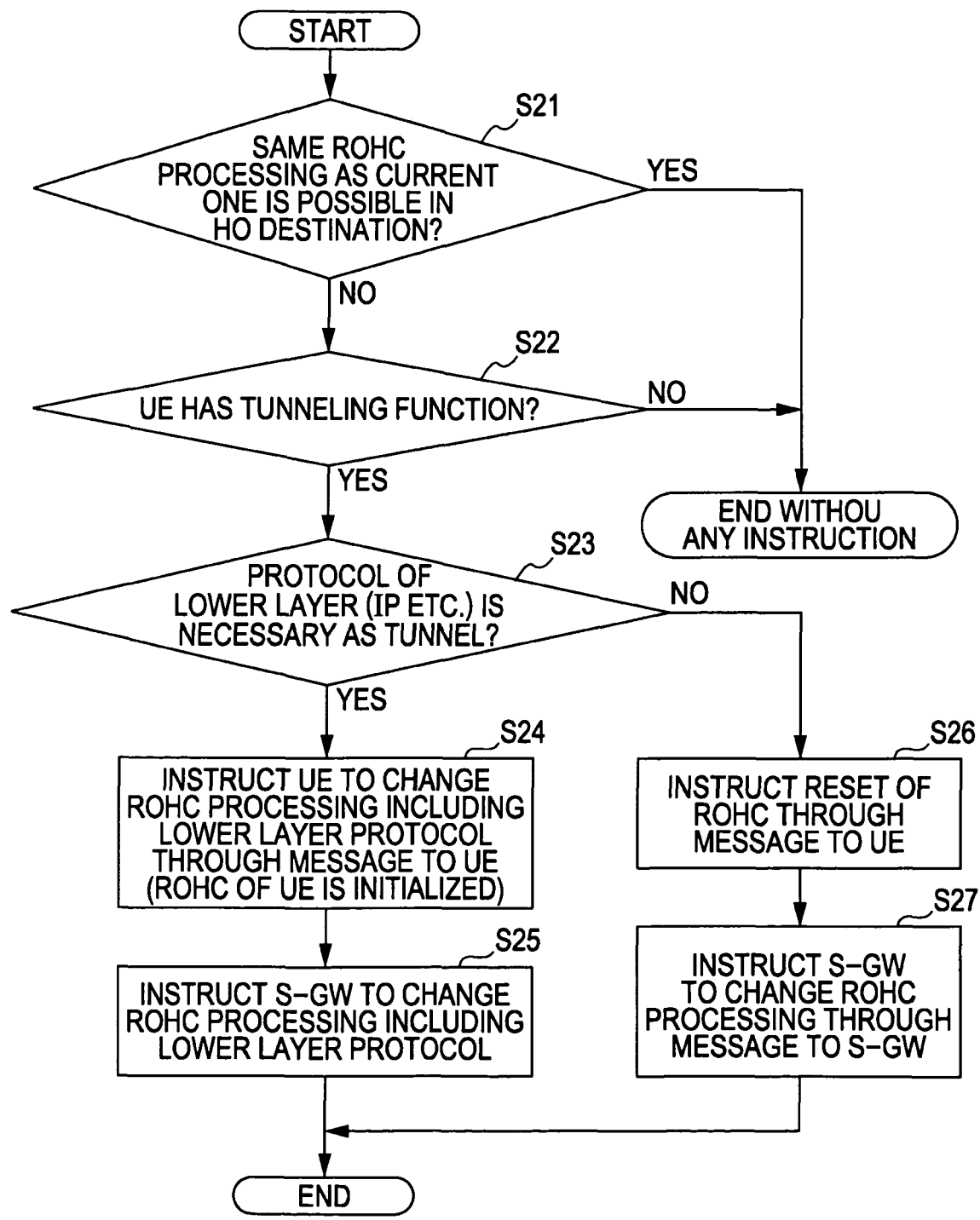
FIG. 7 is a flow chart for describing the operation of the MME shown in FIG. 6.

The operation of the MME 70 constituted as mentioned above (the processing of the MME 70 deciding the packet format for use in the handover destination TA) will be described using the flow chart shown in FIG. 7.

When receiving the relocation request message from the eNB 20 of the handover source TA (Step S2 in FIG. 5), the MME 70 (the signal processing unit 71) specifies the UE 10 for hand over and the handover destination TA according to the contents of the message. The signal processing unit 71 checks whether the same ROHC (IPv6/RTP) processing as the one which the UE 10 has used in communication before handover can be continued in the handover destination TA, in short, whether the handover destination TA supports the ROHC (IPv6/RTP) (Step S21), with reference to the stored information (TA function support situation information) in the TA function support information storing unit 73.

Namely, the signal processing unit 71 functions as a checking unit checking at a time of handover whether the handover destination TA supports the ROHC (IPv6/RTP) used for the packet communication through the handover source TA.

As a result, when the handover destination TA supports the ROHC (IPv6/RTP), the signal processing unit 71 finishes the processing without any processing (YES route in Step S21). In this case, the UE 10 compresses the header of the UL transmission packet according to the ROHC (IPv6/RTP) after handover and then transmits it. According to this, the compression packet is transferred to the S-GW 30 through the SGSN 50 after the header is decompressed in the RNC 40 of the handover destination TA, for example, as illustrated in FIG. 3.

On the other hand, when the handover destination TA does not support the ROHC (IPv6/RTP), the signal processing unit 71 checks whether the above UE 10 supports the function (hereinafter, referred to as a tunneling function) of encapsulating the compression packet of the ROHC (IPv6/RTP) in a lower layer packet to tunnel to the S-GW 30, based on the UE function support situation information in the UE function support information storing unit 72 (from YES route in Step S21 to Step S22).

As a result, when the UE 10 does not support the tunneling function, the signal processing unit 71 finishes the processing (NO route in Step S22). When it does, the signal processing unit 71 checks whether the processing of a lower layer protocol (IP, GTP and the like) is necessary for the tunneling function (from YES route in Step S22 to Step S23).

Namely, when the handover destination TA entities (RNC 40 and GSN 50) assume the IP packet as the payload of the received user packet and when the IP packet is used in order to do a necessary ROHC negotiation between the UE 10 and the S-GW 30, the processing of the lower layer protocol (IP and the like) is required.

When it is necessary (YES in Step S23), the signal processing unit 71 creates information (including the ROHC parameter, tunnel starting instruction, and tunnel destination address) for instructing a change of the ROHC processing including lower layer protocol processing, as the information to be notified to the UE 10 and contains this in the relocation command message. According to this, the information about the instruction of the change is notified to the UE 10 through the handover command and, upon receipt of the notification, the UE 10 initializes the ROHC processing and performs the processing according to the tunneling function (Step S24).

Further, the signal processing unit 71 creates information (including the ROHC parameter) for instructing a change of the ROHC processing including the lower layer protocol, as the information to be notified to the S-GW 30 and includes this in the update bearer request message. According to this, the information about the instruction of the change is notified to the S-GW 30 in the bearer change request message (Step S25) and the S-GW 30 recognizes that a node for performing header decompression of the ROHC (IPv6/RTP) on the UL packet from the UE 10 after handover is set in itself (S-GW 30). The order of the processing in Steps S24 and S25 does not matter and the steps may be performed in parallel.

On the other hand, when the processing of the lower layer protocol (IP, GTP and the like) is not required in the tunneling function (No in Step S23), the signal processing unit 71 creates information for instructing a reset of the ROHC as the information to be notified to the UE 10 and contains this in the relocation command message. Thus, the information is notified to the UE 10 through the handover command and upon receipt of the notification, the UE 10 initializes the ROHC processing (Step S26).

Thus, the ROHC processing in the UE 10 is initialized because the ROHC processing has to be initialized when the ROHC context (ROHC parameter in flow) is not forwarded to the handover destination TA. As another reason, the negotiation of the ROHC parameter (supporting function and the like) has to be done before communication begins in the handover destination TA.

The signal processing unit 71 creates information (including the ROHC parameter) for instructing a change of the ROHC processing as the information to be notified to the S-GW 30 and includes this in the update bearer request message. According to this, the information about the instruction of the change is notified to the S-GW 30 through the bearer change request message (Step S27), and the S-GW 30 recognizes that a node for performing header decompression of the ROHC (IPv6/RTP) on the UL packet from the UE 10 after handover is set in itself (S-GW 30). The order of the processing in Steps S26 and S27 does not matter and the steps may be performed in parallel.

When the signal processing unit 71 judges that the handover destination TA does not support the ROHC (IPv6/RTP), it functions as a control unit controlling the execute point of the processing corresponding to the ROHC (IPv6/RTP) as the S-GW with respect to the packet communication through the handover destination TA.

(2.2) UE

Figure 8:
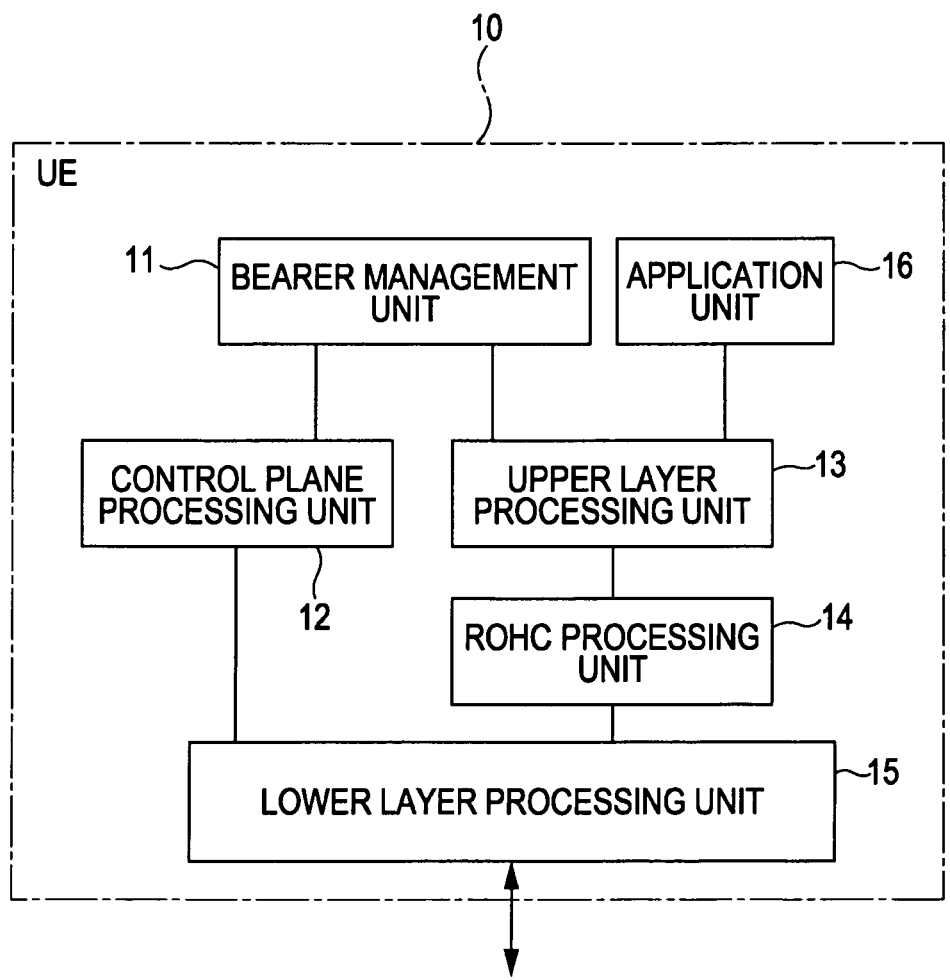
FIG. 8 is a block diagram showing the structure of the UE according to one embodiment.

FIG. 8 is a block diagram showing the structure of the UE 10. The UE 10 shown in FIG. 8 includes, for example, a bearer management unit 11, a control plane (C-plane) processing unit 12, an upper layer processing unit 13, a ROHC processing unit 14, a lower layer processing unit 15, and an application unit 16.

The bearer management unit 11 has a function of managing the DL and JL bearers (wireless bearer) and executing the processing (creating and transmitting/receiving signaling) of setting (establishing and updating) a bearer, in cooperation with the control plane processing unit 12. The bearer management unit 11 also has a function of setting the respective protocol processing in the upper layer processing unit 13, the ROHC processing unit 14, and the lower layer processing unit 15, in reply to the bearer setting request from the control plane processing unit 12.

The control plane processing unit 12 has a function of transmitting and receiving the control message (handover command and handover complete message) accompanying the handover processing and the signaling accompanying the bearer setting corresponding to the request from the bearer management unit 11 through the lower layer processing unit 15 (the interface ("S1-MME") with the MME 70). Namely, the control plane processing unit 12 functions as a handover control unit controlling the processing of handing over to a different wireless access network.

As mentioned above, when the setting (specification) information with the S-GW 30 specified as the header decompression point of the UL ROHC (IPv6/RTP) processing and the header compression point of the DL ROHC (IPv6/RTP) processing is notified by using the handover command, this setting information is received by the control plane processing unit 12.

In this case, the control plane processing unit 12 functions as a receiving unit receiving the information with the S-GW 30 specified as the execution point of the ROHC (IPv6/RTP) processing (header compression/decompression) in the packet flow through the handover destination TA, by receiving the handover command.

According to the setting information, the control plane processing unit 12 performs the setting for the upper layer processing unit 13, the ROHC processing unit 14, and the lower layer processing unit 15 (packet communication unit) through the bearer management unit 11. Namely, it sets the execution point of the ROHC (IPv6/RTP) as the S-GW 30.

According to this setting, the UE 10 can control the execution point of the ROHC (IPv6/RTP) in the packet flow after handover to be fixed in the S-GW 30. In other words, the bearer management unit 11 functions as a control unit controlling the point for executing the ROHC (IPv6/RTP) processing in the handover destination TA to be fixed in the S-GW 30, according to the information received from the MME 70, at the time of handover.

The upper layer processing unit 13 performs the processing defined in an upper layer above the PDCP (ROHC) layer. For example, the upper layer processing unit 13 has a function (processing stack) of processing data of various protocols such as IP, UDP, RTP (RTCP) and the like (terminating and attaching header).

The ROHC processing unit 14 has a function of header compression of a transmitting (UL) packet and header decompression of a receiving (DL) packet of the RQHC protocol positioned as one of the protocol stacks in the PDCP layer (ROHC processing stack) The ROHC processing unit 14 of this example includes at least a ROHC (IPv6/RTP) processing function and optionally includes a ROHC (IPv4/RTP) processing function.

The lower layer processing unit 15 is in charge of the protocol processing defined in a lower layer below the PDCP layer. For example, the lower layer processing unit 15 has a function of processing data of various kinds of protocols (terminating and attaching a header) in the RLC layer, the MAC (Media Access Control) layer, the physical (PHY) layer and the like (processing stack).

The application unit 16 includes a voice communication by VoIP and the like, data communication such as HTTP, FTP and the like, and other various kinds of upper application programs (software) and it is to perform the processing (creating, transmitting and receiving the user data) according to the corresponding programs.

Hereinafter, the operational example of the UE 10 constituted as mentioned above will be described in detail by using FIG. 9 to FIG. 14. Here, the existing technique can be applied to the bearer setting processing and the following description will be made about the processing after handover in a state where the bearer setting has been completed.

(Up Link Processing)

Figure 10:
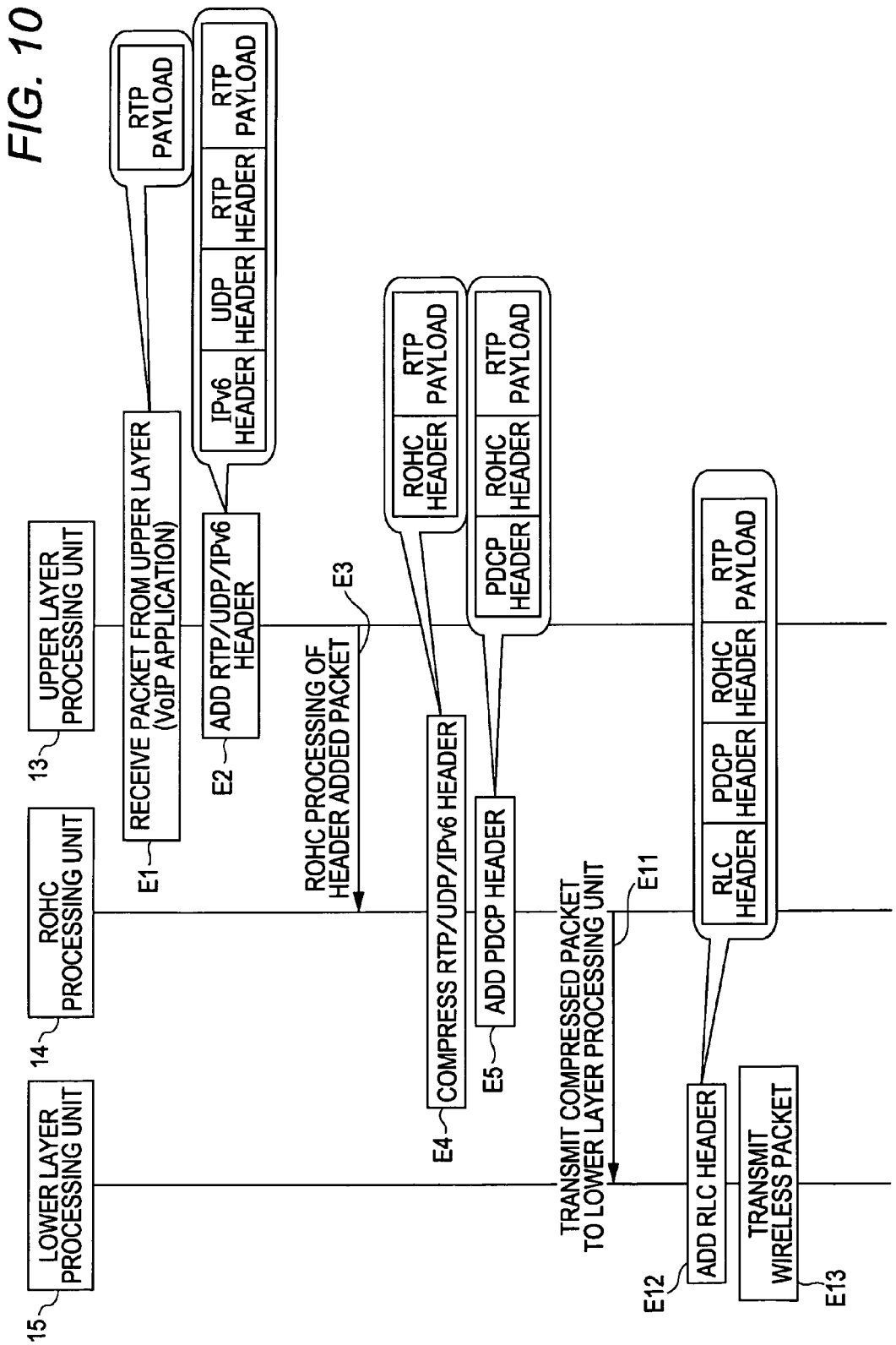
FIG. 10 is a sequence view for describing the UL processing when the UE shown in FIG. 8 does not encapsulate a ROHC packet.
Figure 11:
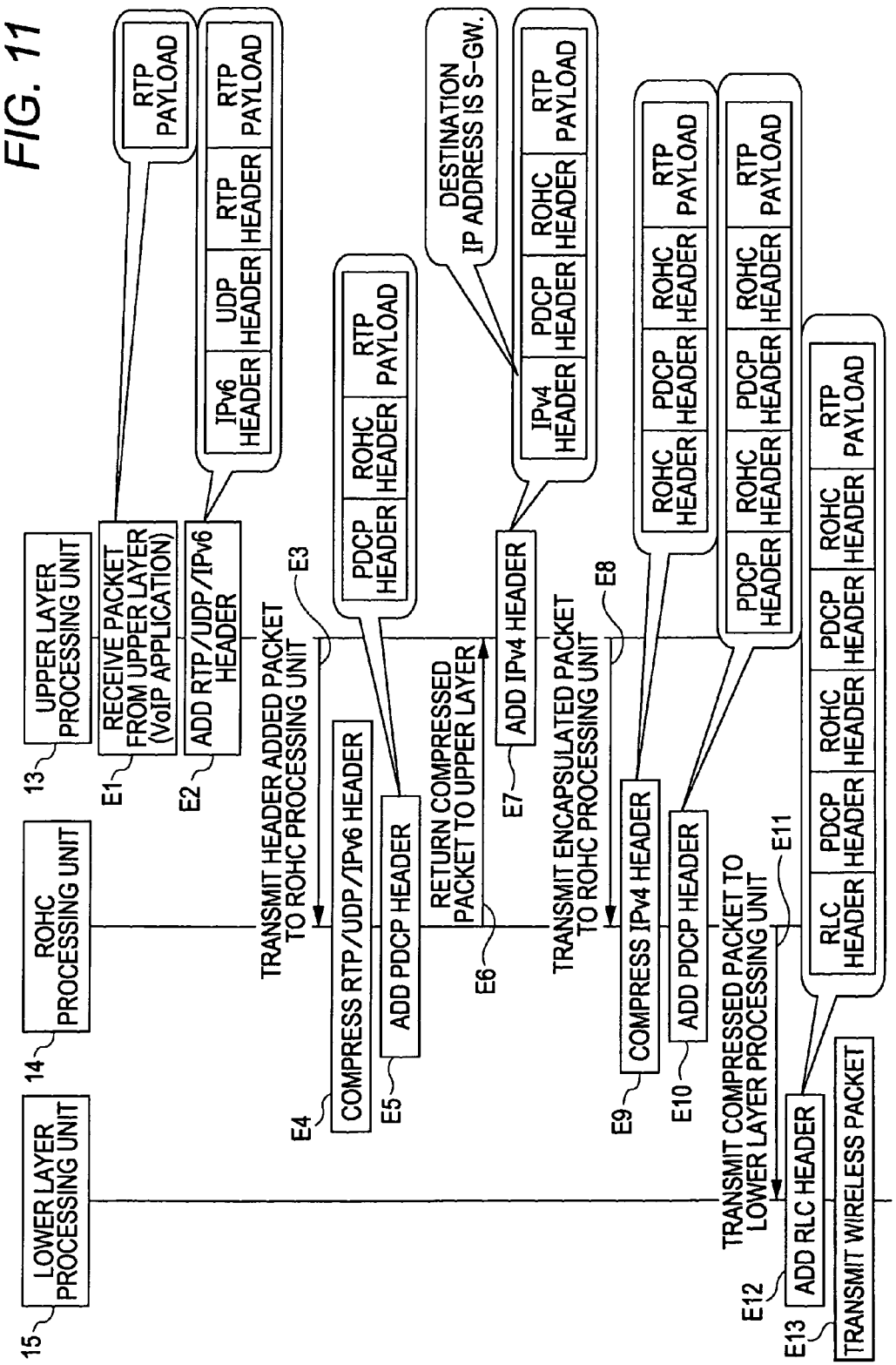
FIG. 11 is s sequence view for describing the UL processing when the UE shown in FIG. 8 encapsulates the ROHC packet.

The UL processing in the UE 10 will be described by using the flow chart shown in FIG. 9 and the sequence views shown in FIG. 10 and FIG. 11. FIG. 10 shows a sequence in the UE 10 when the ROHC (IPv6/RTP) packet is not encapsulated and FIG. 11 shows a sequence in the UE 10 when the ROHC (IPv6/RTP) packet is encapsulated. The processing shown in the flow chart in FIG. 9 corresponds to the DL processing (D1 to D8) described later in the S-GW 30.

When the user data is created in the application unit 16, the UE 10 hands over the user data to the upper layer processing unit 13 (Step E1 in FIG. 10 and FIG. 11). The upper layer processing unit 13 checks whether the user data received from the application unit 16 is the data targeted for compression according to the ROHC (IPv6/RTP) (Step A1 in FIG. 9). This check is performed based on the information, for example, about the connection notified (specified) by the MME 70 at handover which has been stored in the ROHC processing unit 14.

Figure 9:
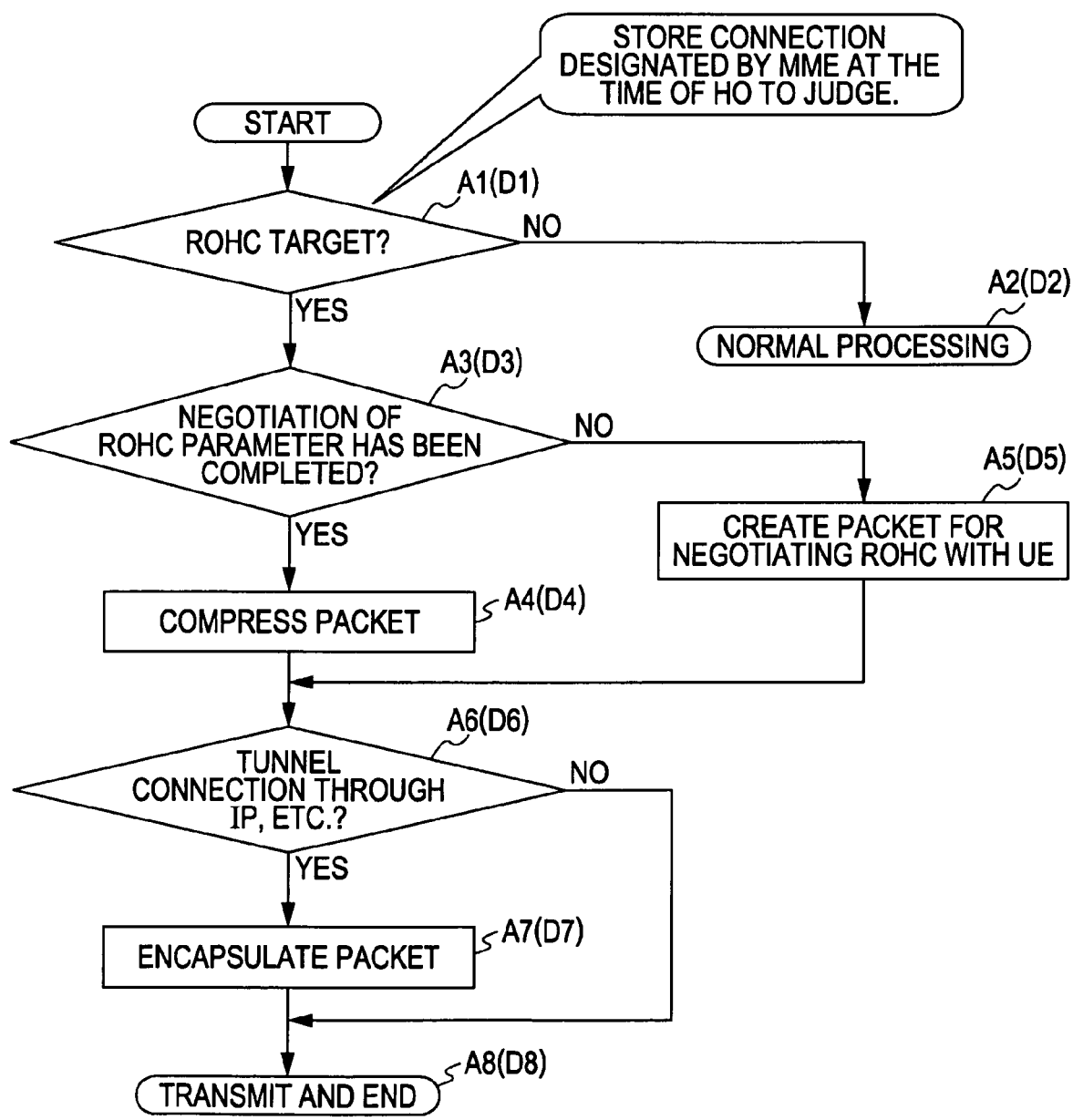
FIG. 9 is a flow chart for describing the UL processing of the UE shown in FIG. 8 (DL processing of an S-GW shown in FIG. 15)

As a result, when it is the data of non-ROHC target (NO in Step A1 in FIG. 9), the UE 10 hereafter performs normal packet processing (Step A2 in FIG. 9).

For example, the upper layer processing unit 13 creates an IPv6 packet with this data fixed as the RTP payload and the RTP/UDP/IPv6 header added thereto and transfers the above packet to the ROHC processing unit 14.

The ROHC processing unit 14 adds the PDCP header to the IPv6 packet and transfers it to the lower layer processing unit 15. The lower layer processing unit 15 further adds the RLC header thereto to create an RLC packet, which is transmitted as a wireless (UL) packet.

On the other hand, when the user data received from the application unit 16 is ROHC target data (YES in Step A1 in FIG. 9), the upper layer processing unit 13 creates an IPv6 packet with this data fixed as the RTP payload and with the RTP/UDP/IPv6 header added to the RTP payload (Step E2 in FIG. 10 and FIG. 11) and transfers the above packet to the ROHC processing unit 14 (Step E3 in FIG. 10 and FIG. 11).

The ROHC processing unit 14 checks whether the negotiation of the ROHC parameter has been completed between the S-GW 30 and itself (Step A3 in FIG. 9). When the negotiation of the ROHC parameter has been completed (YES in Step A3), the ROHC processing unit 14 compresses the IPv6/UDP/RTP header of the IPv6 packet according to the ROHC (IPv6/RTP) based on the negotiated ROHC parameter (Step A4 in FIG. 9 and Step E4 in FIG. 10 and FIG. 11).

When the negotiation of the ROHC parameter has not been completed (NO in Step A3 in FIG. 9), the ROHC processing unit 14 creates a packet for negotiating the ROHC parameter (hereinafter, referred to as a negotiation packet) (Step A5 in FIG. 9). In the ROHC, unlike the flow of the compression (decompression) target data, the ROHC parameter (for example, the type of protocol supported and the maximum number of the contexts (flow)) can be negotiated with the S-GW 30.

The ROHC processing unit 14 checks whether or not the ROHC (IPv6/RTP) packet or the negotiation packet should be encapsulated and tunneled (Step A6 in FIG. 9). The check is performed, for example, according to the information notified from the MME 70 at handover time. When the negotiation of the ROHC parameter is performed by the IP connection, the negotiation packet is the packet which should be encapsulated and tunneled in the IPv4 packet.

As a result, when it is a tunnel packet (YES in Step A6 in FIG. 9), the ROHC processing unit 14 adds the PDCP header to the tunnel packet (Step E5 in FIG. 11) and transmits (returns) it to the upper layer processing unit 13 (Step E6 in FIG. 11).

The upper layer processing unit 13 adds the IPv4 header to the received packet to encapsulate the same packet in the IPv4 packet (Step A7 in FIG. 9 and Step E7 in FIG. 11).

The encapsulated packet (tunnel packet) is transferred from the upper layer processing unit 13 to the ROHC processing unit 14 again (Step E8 in FIG. 11). The ROHC processing unit 14 compresses the IPv4 header of the IPv4 packet according to the ROHC (IPv4/RTP) (Step E9 in FIG. 11), adds the PDCP header thereto (Step E10 in FIG. 11), and transfers it to the lower layer processing unit 15 (Step E11 in FIG. 11).

On the other hand, when it is a non-tunnel packet (NO in Step A6 in FIG. 9), the ROHC processing unit 14 adds the PDCP header to the packet (Step E5 in FIG. 10) and transfers it to the lower layer processing unit 15 (Step E11 in FIG. 10).

The lower layer processing unit 15 adds the RLC header to the PDCP packet (tunnel or non-tunnel packet) transferred from the ROHC processing unit 14 (Step E12 in FIG. 10 and FIG. 11) and transmits it to the handover destination TA entity (RNC 40) (Step A8 in FIG. 9 and Step E13 in FIG. 10 and FIG. 11).

(Down Link Processing)

Figure 13:
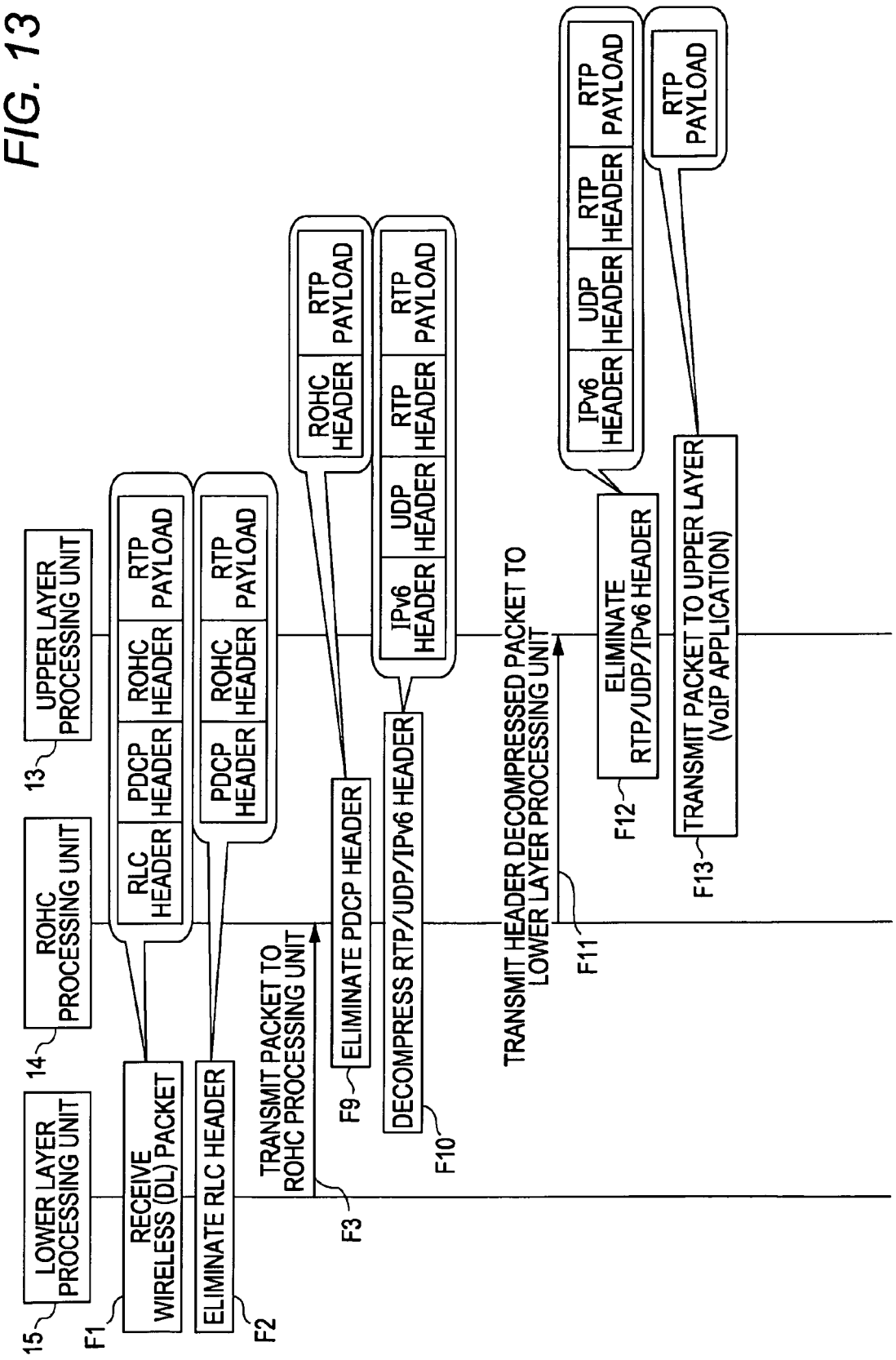
FIG. 13 is a sequence view for describing the DL processing of the UE shown in FIG. 8 (ROHC non-encapsulation)
Figure 14:
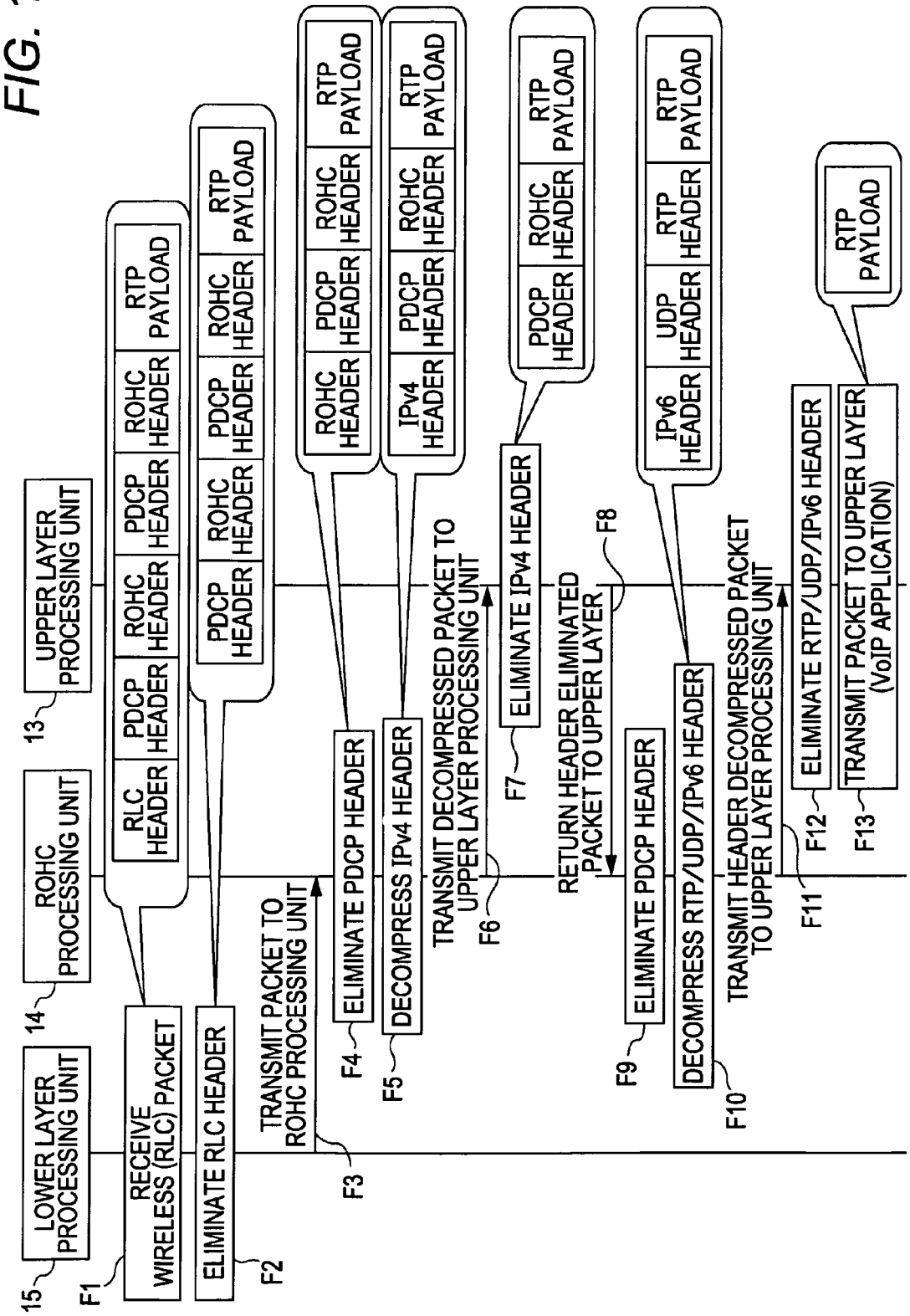
FIG. 14 is a sequence view for describing the DL processing of the UE shown in FIG. 8 (ROHC encapsulation)

The DL processing in the UE 10 will be described in detail using the flow chart in FIG. 12 and the sequence views shown in FIG. 13 and FIG. 14. FIG. 13 shows a sequence in the UE 10 when the ROHC (IPv6/RTP) packet is not encapsulated and FIG. 14 shows a sequence in the UE 10 when the ROHC (IPv6/RTP) packet is encapsulated. The processing shown in the flow chart in FIG. 12 corresponds to the UL processing (C1 to C8) in the S-GW 30.

The UE 10 receives the DL packet (RLC) from the handover destination TA entity (RNC 40), in the lower layer processing unit 15 (Step F1 in FIG. 13 and FIG. 14).

The lower layer processing unit 15 terminates (eliminates) the RLC header of the received packet (Step F2 in FIG. 13 and FIG. 14) and transfers the PDCP packet corresponding to its payload to the ROCH processing unit 14 (Step F3 in FIG. 13 and FIG. 14).

Figure 12:
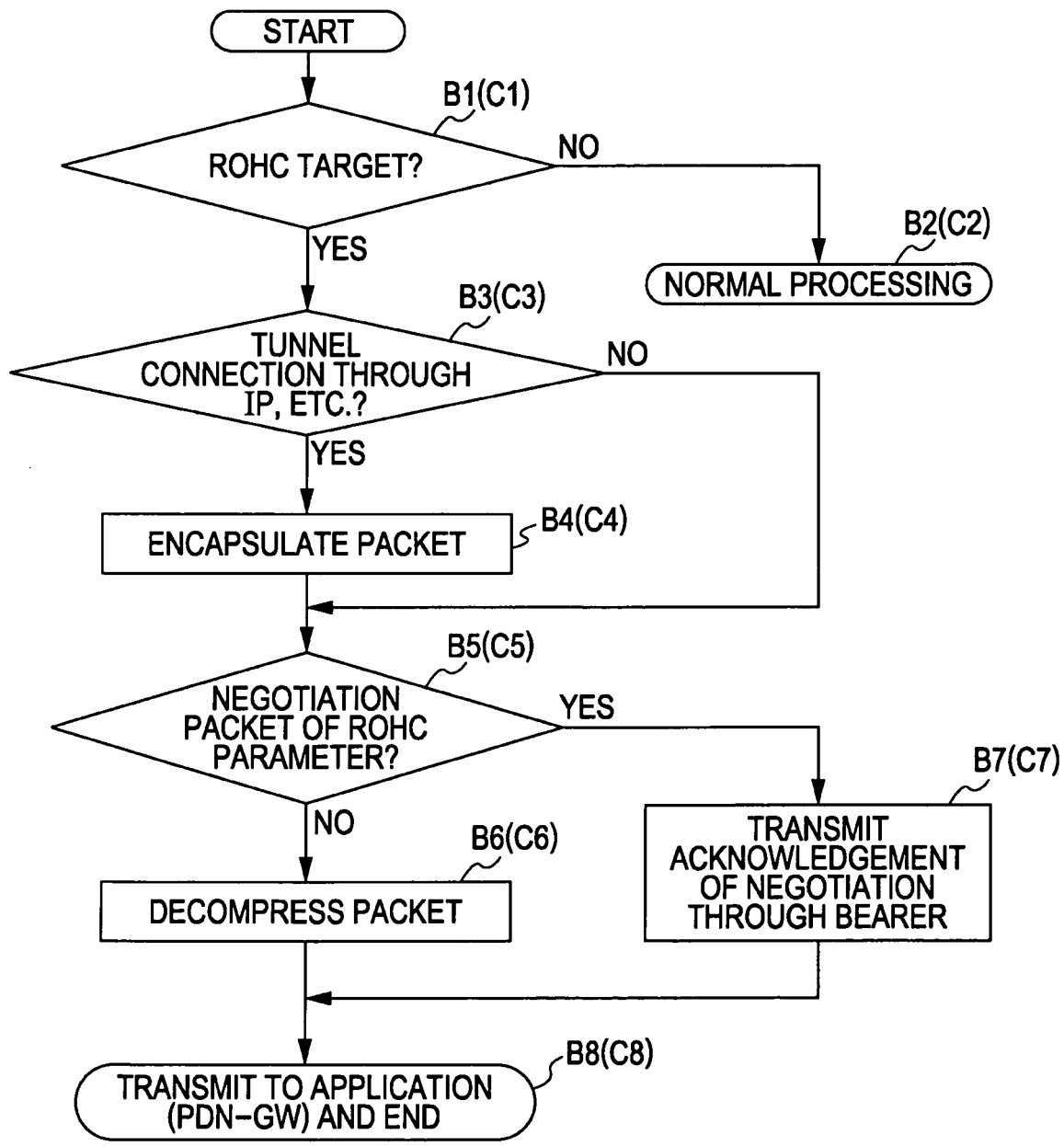
FIG. 12 is a flow chart for describing the down link (DL) processing of the UE shown in FIG. 8 (UL processing of the S-GW shown in FIG. 15)

The ROHC processing unit 14 checks whether the PDCP packet received from the lower layer processing unit 15 is a packet targeted for header decompression according to the ROHC (IPv6/RTP) (Step B1 in FIG. 12). For example, the ROHC processing unit 14 stores the connection specified by the MME 70 at the time of handover and checks which connection the received packet comes from, according to the information, hence to identify the packet targeted for the header decompression.

As a result, when it is a non-ROHC target packet (No in Step B1 in FIG. 12), the UE 10 performs the normal packet processing on the received packet (Step B2 in FIG. 12).

For example, the ROHC processing unit 14 terminates (eliminates) the header of the received PDCP packet and transfers the PDCP payload to the upper layer processing unit 13. The upper layer processing unit 13 terminates (eliminates) the RTP/UDP/IPv6 header of the received pDCP payload and transfers the data (user data) of the RTP payload to the application unit 16.

On the other hand, when the PDCP packet received from the lower layer processing unit 15 is a ROHC target packet according to the ROHC (IPv6/RTP) (YES in Step B1 in FIG. 12), the ROHC processing unit 14 checks whether the received packet is an encapsulated tunnel packet or not (Step B3 in FIG. 12). The check is performed, for example, according to the information notified by the MME 70 at the time of handover.

As a result, when it is a tunnel packet (YES in Step B3 in FIG. 12), the ROHC processing unit 14 terminates (eliminates) the header of the received PDCP packet (Step F4 in FIG. 14), decompresses the ROHC (IPv4/RTP) header of the payload (Step F5 in FIG. 14), and transfers the header-decompressed packet to the upper layer processing unit 13 (Step F6 in FIG. 14).

The upper layer processing unit 13 terminates (eliminates) the header of the received packet and decapsulates the above (Step B4 in FIG. 12 and Step F7 in FIG. 14), hence to transmit (return) the header-eliminated PDCP packet to the ROHC processing unit 14 (Step F8 in FIG. 14).

The ROHC processing unit 14 terminates (eliminates) the header of the received PDCP packet (Step F9 in FIG. 14) and checks whether or not the PDCP payload is a negotiation packet of the ROHC parameter (Step B5 in FIG. 12).

When the received packet is not a tunnel packet (NO in Step B3 in FIG. 12), the ROHC processing unit 14 terminates (eliminates) the header of the PDCP packet received from the lower layer processing unit 15 (Step F9 in FIG. 13) and similarly checks whether or not the PDCP payload is a negotiation packet of the ROHC parameter (Step B5 in FIG. 12).

As a result, when it is a negotiation packet (YES in Step B5 in FIG. 12), the ROHC processing unit 14 notifies the contents to the bearer management unit 11 through the upper layer processing unit 13. According to this, the bearer management unit 11 creates an acknowledgement of the negotiation (notification of the ROHC parameter) and the UL bearer transmits the acknowledgement through the lower layer processing unit 15 (Step B7 in FIG. 12).

On the other hand, when it is not a negotiation packet (NO in Step B5 in FIG. 12), the ROHC processing unit 14 decompresses the ROHC (IPv6/RTP) header of the PDCP payload to restore the IPv6 packet (Step B6 in FIG. 12 and Step F10 in FIG. 13 and FIG. 14). The ROHC processing unit 14 transfers this packet to the upper layer processing unit 13 again (Step F11 in FIG. 13 and FIG. 14).

The upper layer processing unit 13 terminates (eliminates) the RTP/UDP/IPv6 header of the received packet (Step F12 in FIG. 13 and FIG. 14) and transfers the data (user data) of the RTP payload to the application unit 16 (Step B8 in FIG. 12 and Step F13 in FIG. 13 and FIG. 14).

(2.3) S-GW

Figure 15:
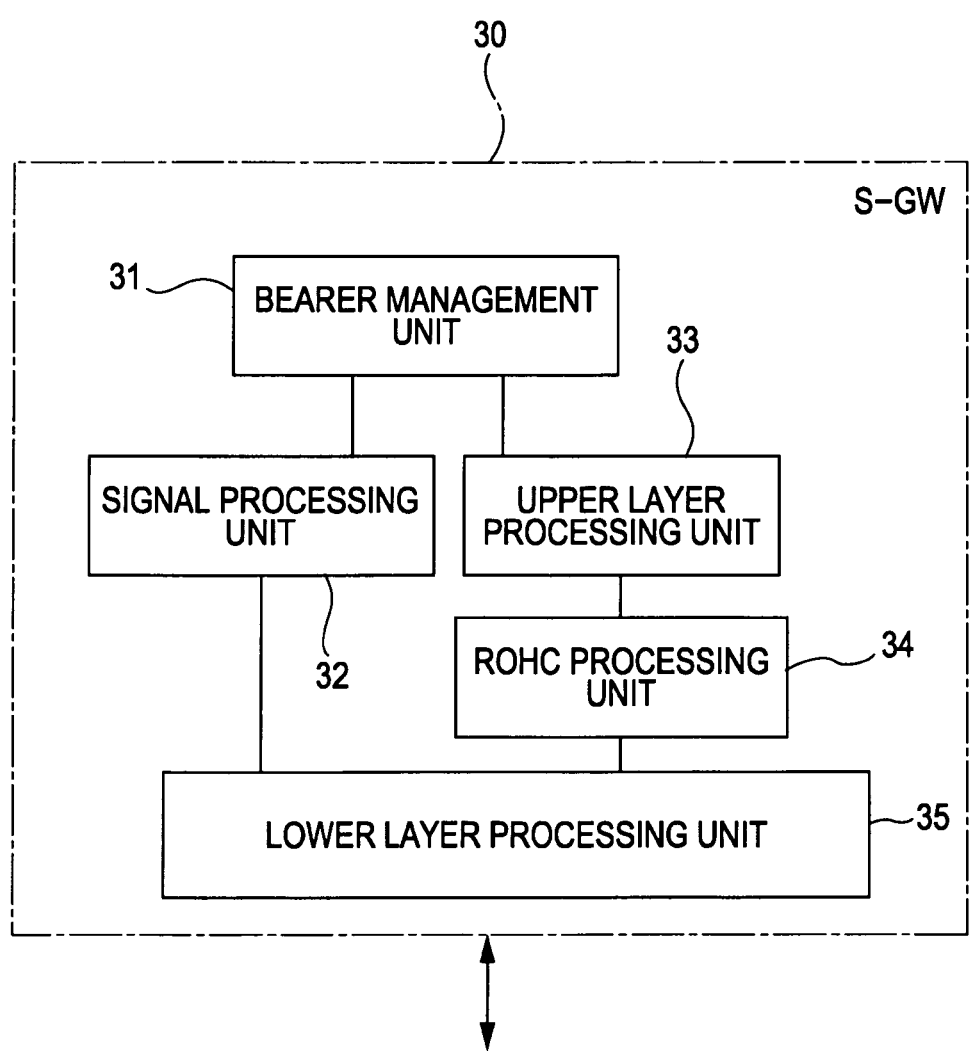
FIG. 15 is a block diagram showing the structure of the S-GW according to one embodiment.

FIG. 15 is a block diagram showing the structural example of the S-GW 30. The S-GW 30 shown in FIG. 15 includes, for example, a bearer management unit 31, a signal processing unit 32, an upper layer processing unit 33, a ROHC processing unit 34, and a lower layer processing unit 35.

The bearer management unit 31 has a function of managing the DL and UL bearers and performing the setting (establishing and updating) processing (creating, transmitting and receiving signaling) of the bearers in cooperation with the signal processing unit 32. The bearer management unit 31 also has a function of setting the processing of various protocols for the upper layer processing unit 33, the ROHC processing unit 34, and the lower layer processing unit 35, in reply to the bearer setting request from the signal processing unit 32.

The signal processing unit 32 has a function of transmitting and receiving a control message accompanying the handover processing (update bearer request message and its acknowledgement message) and the signaling accompanying the bearer setting in reply to a request from the bearer management unit 31, through the lower layer processing unit 35 (the interface ("S1-MME") with the MME 70).

When the setting information in which the execution point of the ROHC (IPv6/RTP) processing is fixed within itself station 30 is notified through the update bearer request message, as mentioned above, this setting information is received by the signal processing unit 32.

The signal processing unit 32 functions as a receiving unit receiving the information that the MME 70 transmits when the handover destination TA of the UE 10 does not support the ROHC (IPv6/RTP), as well as the information for specifying the execution point of the processing corresponding to the ROHC (IPv6/RTP), in the packet communication through the handover destination TA.

In this case, the signal processing unit 32 functions as a receiving unit receiving the setting information in which the execution point of the ROHC (IPv6/RTP) processing is set within itself, station 30, in the packet flow after handover, by receiving the update bearer request message.

The signal processing unit 32 performs the setting on the upper layer processing unit 33, the ROHC processing unit 34, and the lower layer processing unit 35 (packet communication unit) through the bearer management unit 31, according to the setting information. Namely, the execution point of the ROHC (IPv6/RTP) processing is set within itself, station 30, in the packet flow through the handover destination TA after the UE 10 hands over.

This setting enables the S-GW 30 to perform a packet communication control to set the execution point of the ROHC (IPv6/RTP) processing in the packet flow through the handover destination TA after the UE 10 hands over. In other words, the bearer management unit 31 functions as a control unit controlling the execution point of the ROHC (IPv6/RTP) processing to be fixed within itself, station 30, in the packet communication through the handover destination TA, according to the information received from the MME 70 when the UE 10 hands over.

The upper layer processing unit 33 performs the processing defined in an upper layer above the PDCP (ROHC) layer. For example, the upper layer processing unit 33 has a function (processing stack) of processing (terminating and attaching a header) the data of various protocols such as IP, UDP, RTP (RTCP) and the like.

The ROHC processing unit 34 has a function (ROHC processing stack) of header compression of a transmitting (UL) packet and header decompression of a receiving (DL) packet according to the ROHC protocol which is one of the protocol stacks of the PDCP layer. The ROHC processing unit 34 of this example has at least a ROHC processing function of IPv6 and optionally has a ROHC processing function of IPv4.

The lower layer processing unit 35 is in charge of the protocol processing defined in a lower layer below the PDCP layer. For example, the lower layer processing unit 35 has a function of processing (terminating and attaching a header) the data of various kinds of protocols such as the RLC layer, the MAC (Media Access Control) layer, the physical (PHY) layer and the like.

Hereinafter, an operational example of the S-GW 30 constituted as mentioned above will be described in detail by using FIG. 9, FIG. 12, and FIG. 16 to FIG. 19. Here, the existing technique can be applied to the bearer setting processing and the following description will be made about the processing after handover in a state where the bearer setting has been completed.

(Up Link Processing)

The processing when the S-GW 30 receives a UL packet from the UE 10 will be described in detail using the flow chart in FIG. 12 and the sequence views shown in FIG. 16 and FIG. 17. FIG. 16 shows a sequence in the S-GW 30 when the ROHC (IPv6/RTP) packet is not encapsulated and FIG. 17 shows a sequence in the S-GW 30 when the ROHC (IPv6/RTP) packet is encapsulated.

The S-GW 30 receives the DL packet (RLC) from the entity (SGSN 50) in the handover destination TA of the UE 10, in the lower layer processing unit 35 (Step G1 in FIG. 16 and FIG. 17).

The lower layer processing unit 35 terminates (eliminates) the respective headers of L2, IP, UDP, and GTP-U of the received packet (Step G2 in FIG. 16 and FIG. 17) and checks whether the PDCP packet corresponding to its payload is a packet targeted for header decompression according to the ROHC (IPv6/RTP) (Step C1 in FIG. 12).

For example, when it is the connection encapsulated in IP, it is judged that the packet whose destination IP address is the address of the self station (S-GW 30) is the target for header decompression. By transferring the header-eliminated packet to the ROHC processing unit 34, this check may be performed by the ROHC processing unit 34. In this case, the ROHC processing unit 34 stores the connection specified by the MME 70 at the time of handover hence to identify the packet targeted for header decompression by judging which connection the received packet comes from, according to the information.

As a result, when it is a non-ROHC target packet (No in Step C1 in FIG. 12), the lower layer processing unit 35 transfers the header-eliminated packet to the upper layer processing unit 33. The upper layer processing unit 33 transfers the received packet to the lower layer processing unit 35, in order to transfer it to the PDN-GW 60. The lower layer processing unit 35 adds the GTP-U (or mobile IP) header with the destination set at the PDN-GW 60 to the above packet to encapsulate and transmit it (Step C2 in FIG. 12).

On the other hand, when it is a ROHC target packet (YES in Step C1 in FIG. 12), the lower layer processing unit 35 checks whether the received packet is an encapsulated tunnel packet (for example, IP packet) or not (Step C3 in FIG. 12).

As a result, when it is a tunnel packet (YES in Step C3 in FIG. 12), the lower layer processing unit 35 transfers the header-eliminated packet (GTP-U payload) to the upper layer processing unit 33 (Step G3b in FIG. 17).

The upper layer processing unit 33 terminates (eliminates) the IP header of the received GTP-U payload to decapsulate (Step C4 in FIG. 12 and Step G4 in FIG. 17) and transfers the payload to the ROHC processing unit 34 (Step G5 in FIG. 17).

When the received packet is a non-tunnel packet (NO in Step C3 in FIG. 12), the lower layer processing unit 35 transfers the packet (GTP payload) with the respective headers of L2, IP, UDP, and GTP-U eliminated, to the ROHC processing unit 34 (Step G3a in FIG. 16).

The ROHC processing unit 34 checks whether the GTP payload of the tunnel or non-tunnel packet received from the upper layer processing unit 33 or the lower layer processing unit 35 is a negotiation packet of the ROHC parameter (Step C5 in FIG. 12).

When it is a negotiation packet (YES in Step C5), the ROHC processing unit 34 notifies the contents to the bearer management unit 31 through the upper layer processing unit 33. Thus, the bearer management unit 31 creates an acknowledgement of the negotiation (notification of the ROHC parameter) and the DL bearer transmits the acknowledgment through the lower layer processing unit 35 (Step C7 in FIG. 12).

On the other hand, when it is not a negotiation packet (NO in Step C5 in FIG. 12), the ROHC processing unit 14 eliminates the PDCP header (Step G6 in FIG. 16 and FIG. 17) and decompresses the ROHC (IPv6/RTP) header of the PDCP payload to restore the IPv6 packet (Step C6 in FIG. 12 and Step G7 in FIG. 16 and FIG. 17). The ROHC processing unit 14 transfers the packet to the upper layer processing unit 33 again (Step G8 in FIG. 16 and FIG. 17).

The upper layer processing unit 33 transfers the received packet to the lower layer processing unit 35 as it is without any processing (Step G9 in FIG. 16 and FIG. 17). The lower layer processing unit 35 adds the respective headers L2, IP, UDP, and GTP-U to the received IPv6 packet (Step G10 in FIG. 16 and FIG. 17) and transfers it to the PDN-GW 60 (Step C8 in FIG. 12 and Step G11 in FIG. 16 and FIG. 17).

(Down Link Processing)

The processing when the S-GW 30 transmits a DL packet to the UE 10 will be described using the flow chart shown in FIG. 9 and the sequence views shown in FIG. 18 and FIG. 19. FIG. 18 shows a sequence in the S-GW 30 when the ROHC (IPv6/RTP) packet is not encapsulated and FIG. 19 shows a sequence in the S-GW 30 when the ROHC (IPv6/RTP) packet is encapsulated.

Upon receipt of the packet from the PDN-GW 60 at the lower layer processing unit 35, the S-GW 30 terminates (eliminates) the respective headers L2, IP, UDP, and GTP-U in the lower layer processing unit 35 (Steps H1 and H2 in FIG. 18 and FIG. 19) and transfers the GTP payload (IP packet) to the upper layer processing unit 33 (Step H3 in FIG. 18 and FIG. 19).

The upper layer processing unit 33 transfers the received GTP payload to the ROHC processing unit 34 as it is (Step H4 in FIG. 18 and FIG. 19).

The ROHC processing unit 34 checks whether the received payload (IP packet) is the data targeted for compression according to the ROHC (IPv6/RTP) or not (Step D1 in FIG. 9). For example, the connection notified (specified) from the MME 70 at the time of handover is stored in the ROHC processing unit 14 and then this check is made according to this information.

As a result, when it is the non-ROHC target data (NO in Step D1 in FIG. 9), the UE 10 hereinafter performs the normal packet processing (Step D2 in FIG. 9).

For example, the ROHC processing unit 34 transfers the payload to the lower layer processing unit 35, and the lower layer processing unit 35 adds the respective headers L2, IP, UDP, and GTP-U to the received payload and transmits the packet to the SGSN 50.

On the other hand, when the GTP payload (IPv6 packet) of the packet received from the PDN-GW 60 is a ROHC target data (YES in Step D1 in FIG. 9), the ROHC processing unit 34 checks whether the negotiation of the ROHC parameter with the UE 10 has been completed or not (Step D3 in FIG. 9). In the ROHC, unlike the flow of the compression (decompression) target data, the ROHC parameter (for example, the type of the supporting protocol and the maximum number of the contexts (flow)) can be negotiated with the UE 10.

When the negotiation of the ROHC parameter has been completed (YES in Step D3 in FIG. 9), the ROHC processing unit 34 compresses the RTP/UDP/IPv6 header of the IPv6 packet into the ROHC (IPv6/RTP) header (Step D4 in FIG. 9 and Step H5 in FIG. 18 and FIG. 19).

When the negotiation of the ROHC parameter has not been completed (NO in Step D3 in FIG. 9), the ROHC processing unit 34 creates a packet for negotiating the ROHC parameter (hereinafter, referred to as a negotiation packet) (Step D5 in FIG. 9).

The ROHC processing unit 34 checks whether the ROHC (IPv6/RTP) packet or the negotiation packet is to be encapsulated and tunneled (Step D6 in FIG. 9). The check is performed, for example, according to the information notified from the MME 70 at the time of handover. When the negotiation of the ROHC parameter is performed through the IP connection, the negotiation packet is the packet to be encapsulated and tunneled into the IP packet.

As a result, when it is a tunnel packet (YES in Step D6 in FIG. 9), the ROHC processing unit 34 adds the PDCP header to the tunnel packet and transfers it to the upper layer processing unit 33 (Step H7 in FIG. 19).

The upper layer processing unit 33 adds the IPv4 header to the received packet and encapsulates the same packet into the IPv4 packet (Step D7 in FIG. 9 and Step H8 in FIG. 19) and transfers it to the lower layer processing unit 35 (Step H9*a* in FIG. 19).

On the other hand, when it is not a tunnel packet (NO in Step D6 in FIG. 9), the ROHC processing unit 34 adds the PDCP header to the packet (Step H6 in FIG. 18) and transfers the packet to the lower layer processing unit 35 (Step H9*b* in FIG. 18).

The lower layer processing unit 35 adds the respective headers L2, IP, UDP, and GTP-U to the tunnel or non-tunnel PDCP packet transferred from the ROHC processing unit 34 (Step H10 in FIG. 18 and FIG. 19) and transfers it to the SGSN 50 (Step D8 in FIG. 9 and Step H11 in FIG. 18 and FIG. 19).

As mentioned above, according to certain embodiments, even when the handover destination TA of the UE 10 does not support the ROHC (IPv6/RTP) processing used before handover, the UE 10 can continue the ROHC (IPv6/RTP) processing, which has been used before handover, properly in the handover destination TA.

Further, the UE 10 in the UL (S-GW 30 in the DL) can decrease the information amount by encapsulating the header-compressed IPv6 packet into the IPv4 packet and further compressing the header of the IPv4 packet according to the ROHC (IPv4/RTP), in the packet flow after handover. Thereby tunneling the UL (DL) packet to the execution point of the ROHC (IPv6/RTP) processing.

Further, by installing a function (unit) for setting the execute point of the ROHC (IPv6/RTP) processing into the MME 70 for managing the handover of the UE 10, a message concerning the handover processing according to the handover of the UE 10 can be used in order to set the ROHC execution point (information notification). Accordingly, the UE 10 can properly continue the ROHC (IPv6/RTP) processing performed before handover even after handover, without drastically changing the SAE architecture. The setting function may be installed in another entity in the SAE architecture.

Further, in order to realize the above-mentioned processing (function), some functions have only to be added to the UE 10, the S-GW 30, and the MME 70 and the other entities in the SAE architecture do not necessarily have to be changed, hence for compatibility.

In an embodiment of the present invention, some or all of the method components are implemented as a computer executable code. Such a computer executable code contains a plurality of computer instructions that when performed in a predefined order result with the execution of the tasks disclosed herein. Such computer executable code may be available as source code or in object code, and may be further comprised as part of, for example, a portable memory device or downloaded from the Internet, or embodied on a program storage unit or computer readable medium. The principles of the present invention may be implemented as a combination of hardware and software and because some of the constituent system components and methods depicted in the accompanying drawings may be implemented in software, the actual connections between the system components or the process function blocks may differ depending upon the manner in which the present invention is programmed.

The computer executable code may be uploaded to, and executed by, a machine comprising any suitable architecture. Preferably, the machine is implemented on a computer platform having hardware such as one or more central processing units ("CPU"), a random access memory ("RAM"), and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

The functions of the various elements shown in the figures may be provided through the use of dedicated hardware as well as hardware capable of executing appropriate software. When provided by a processor, the functions may be provided by a single dedicated processor, by a single shared processor, or by a plurality of individual processors, some of which may be shared. Explicit use of the term "processor" or "controller" should not be construed to refer exclusively to hardware capable of executing software, and may implicitly include, without limitation, digital signal processor hardware, ROM, RAM, and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended

What is claimed is:

1. A packet communication method in a packet communication system having a wireless terminal, wireless access networks, a management device, and a packet communication device coupled to the wireless access networks respectively, comprising:
   checking, by the management device, whether a handover destination wireless access network supports a first header compression or decompression method used in a first packet communication performed through a handover source wireless access network, when the wireless terminal hands over from the handover source wireless access network to the handover destination wireless access network, the handover source wireless access network and the handover destination wireless access network being two of the wireless access networks;
   transferring, by the management device, an execution point for packet processing from the handover source wireless access network to the packet communication device for a second packet communication through the handover destination wireless access network when the handover destination wireless access network does not support the first header compression or decompression method, the packet processing including executing the first header compression or decompression method; and
   when the handover destination wireless access network supports a second header compression or decompression method different from the first header compression or decompression method, converting a packet processed in the first header compression method into a tunnel packet to be tunneled to the execution point in the second packet communication and compressing a header of the tunnel packet in the second header compression method.

2. A packet communication system having a wireless terminal, wireless access networks, and a packet communication device coupled to the wireless access networks respectively, comprising:
   a handover control unit configured to control handover processing for handover of the wireless terminal to a different wireless access network;
   a signal processing unit configured to check whether a handover destination wireless access network supports a header compression or decompression method used in a first packet communication performed through a handover source wireless access network, at a time of the handover from the handover source wireless access network to the handover destination wireless access network, the handover source wireless access network and the handover destination wireless access network being two of the wireless access networks; and
   a controller configured to
      transfer an execution point for packet processing from the handover source wireless access network to the packet communication device for a second packet communication performed through the handover destination wireless access network when the handover destination wireless access network does not support the header compression or decompression method, the packet processing including executing the first header compression or decompression method; and
      when the handover destination wireless access network supports a second header compression or decompression method different from the first header compression or decompression method, convert a packet processed in the first header compression method into a tunnel packet to be tunneled to the execution point in the second packet communication and compress a header of the tunnel packet in the second header compression method.

3. In a packet communication system having a wireless terminal, wireless access networks, a packet communication device coupled to the wireless access networks respectively, and a management device, the wireless terminal comprising:
   a packet communication unit configured to perform a packet communication using a first header compression or decompression method;
   a handover control unit configured to control handover processing for handing over to a different wireless access network;
   a receiving unit configured to receive information that the management device transmits when a handover destination wireless access network does not support the first header compression or decompression method, the information transferring an execution point for packet processing from a handover source wireless access network to the packet communication device, the packet processing including executing the first header compression or decompression method for packet communication performed through the handover destination wireless access network, the handover source wireless access network and the handover destination wireless access network being two of the wireless access networks;
   a control unit configured to control the packet communication unit to transfer the execution point for packet processing for the packet communication performed through the handover destination wireless access network to the packet communication device, based on the information received by the receiving unit; and
   when the handover destination wireless access network supports a second header compression or decompression method different from the first header compression or decompression method, the packet communication unit being further configured to encapsulate a packet processed in the first header compression method into a tunnel packet to be tunneled to the execution point at the packet communication device for the packet communication performed through the handover destination wireless access network and compress a header of the tunnel packet in the second header compression method.

4. In a packet communication system having a wireless terminal, wireless access networks, a packet communication device coupled to the wireless access networks respectively, and a management device, the packet communication device comprising:
   a packet communication unit configured to perform a packet communication using a first header compression or decompression method;
   a receiving unit configured to receive information that the management device transmits when a handover destination wireless access network of the wireless terminal does not support the first header compression or decompression method, the information specifying a transfer of an execution point for packet processing from a handover source wireless access network to the packet communication device, the packet processing including executing the first header compression or decompression method for packet communication performed through the handover destination wireless access network, the handover source wireless access network and the handover destination wireless access network being two of the wireless access networks; and a control unit configured to control the packet communication unit to specify the execution point for packet processing for the packet communication through the handover destination wireless access network at the packet communication device, based on the information received by the receiving unit: and when the handover destination wireless access network supports a second header compression or decompression method different from the first header compression or decompression method, the packet communication unit being further configured to decapsulate the packet which has been processed in the first header compression method and encapsulated in a tunnel packet to be tunneled to the execution point for the packet communication performed through the handover destination wireless access network, and decompress the tunnel packet in the second header decompression method when the tunnel packet is compressed in the second header compression method.

* * * * *